United States Patent [19]
Libman

[11] Patent Number: 5,987,434
[45] Date of Patent: Nov. 16, 1999

[54] APPARATUS AND METHOD FOR TRANSACTING MARKETING AND SALES OF FINANCIAL PRODUCTS

[76] Inventor: Richard Marc Libman, 928 20th St. Unit #6, Santa Monica, Calif. 90403

[21] Appl. No.: 08/661,004

[22] Filed: Jun. 10, 1996

[51] Int. Cl.$^6$ .................................................. G06F 157/00
[52] U.S. Cl. .............................. 705/36; 705/34; 705/35; 705/39; 705/42
[58] Field of Search .................................. 705/4, 36, 42, 705/35, 38, 39, 41, 30, 34, 7; 364/401; 395/201, 244

[56] References Cited

U.S. PATENT DOCUMENTS

| | | | |
|---|---|---|---|
| 4,831,526 | 5/1989 | Lucks et al. | 705/4 |
| 5,124,911 | 6/1992 | Sack | 705/10 |
| 5,220,501 | 6/1993 | Lawlor et al. | 364/408 |
| 5,502,636 | 3/1996 | Clarke | 364/401 |
| 5,504,675 | 4/1996 | Cragun et al. | 364/401 |
| 5,523,942 | 6/1996 | Tyler et al. | 705/4 |
| 5,537,314 | 7/1996 | Kanter | 364/406 |
| 5,592,375 | 1/1997 | Salmon et al. | 705/7 |
| 5,640,835 | 6/1997 | Muscoplat | 53/569 |
| 5,643,402 | 7/1997 | Ryan et al. | 705/38 |
| 5,644,727 | 7/1997 | Atkins | 705/40 |
| 5,655,085 | 8/1997 | Ryan et al. | 705/4 |
| 5,710,889 | 1/1998 | Clark et al. | 395/244 |
| 5,819,241 | 10/1998 | Reiter | 705/408 |

OTHER PUBLICATIONS

"Agenda for Windows" Software Brochure from Agena Corporation, Nov. 1995.
"Agency Manager for Windows" Software Brochure from Applied Systems, Los Angeles, California, 1994.
SelectQuote Insurance Services Letters and Quote, SelectQuote Insurance Services of San Francisco, California, Jun. 12, 1995.
Saommers/Moreland & Associates, Inc. Letter and Quote, Sommers/Moreland & Associates, Inc., Atlanta, Georgia, Jul. 8, 1995.
Wells Fargo Insurance Services Letter and Sales Literature, Wells Fargo Insurance Services, Brisbane, California, date unknown.
Consumers Choice Financial Services Company Quote.
USAA Credit Card Statement Attachment.
AT&T Account Statement.
David T. Phillips and Co. Insurance Solicitation.
Equigard Insurance Services, Inc. Solicitation.
CONA Life Insurance Solicitation.
American Savings Bank Solicitation.
IQ Insurance Quote Services, Inc. Solicitation.
TermQuote Life Insurance Solicitation.

*Primary Examiner*—Allen R. MacDonald
*Assistant Examiner*—Romain Jeanty
*Attorney, Agent, or Firm*—Snell & Wilmer L.L.P.

[57] ABSTRACT

An apparatus and method which use client information to automatically select and present financial products appropriate for the client. The apparatus according to one aspect includes an input device for inputting client information, financial product information, ancillary data, and decision criteria; a storage device for storing the inputted items; decision making logic circuitry for using the inputted items to select a subset of the financial products; and an output device for preparing a client communication which identifies the subset of the financial products. The output device incorporates a portion of the client information and a portion of the financial products information into the client communication. The method according to one aspect includes inputting the same items; storing these inputted items; using the stored items to select a subset of the financial products; and preparing a client communication which identifies the subsets of the inputted information and incorporates it into the client communication.

56 Claims, 14 Drawing Sheets

APPARATUS AND METHOD FOR TRANSACTING MARKETING AND SALES OF FINANCIAL PRODUCTS

BACKGROUND OF THE INVENTION

1. Field of the Invention

The present invention relates to apparatus and methods for marketing financial products such as individual insurance policies. More specifically, it relates to apparatus and methods for marketing such products in a fully automated or significantly automated manner to achieve high volumes of transactions and sales in a short period of time.

2. Description of the Related Art

Financial products such as life insurance products, health insurance products, and the like traditionally have been marketed largely through the use of agents. The product providers, such as the insurance companies actually providing the insurance, rely upon the agents to perform a host of essential tasks to sell their products. The agents, for example, typically identify prospective clients ("prospects") and communicate with these prospects to determine which of the various financial products are appropriate for that individual. A "prospective client" or "client" as used in this document refers to a person, company, or other entity to whom a financial product has never before been sold by the system user of marketer, and an existing client of that user or marketer which has purchased financial products in the past and for which a client record has been created in the client database as described more fully below. In a representative case, for example, the agent obtains a limited amount of basic or "lead" information about the prospective client from which to initiate the marketing contact. In the case of a mortgage insurance policy, for example, the agent may obtain the type of information included in a recorded deed instrument, including the potential client's name, address, age, and mortgage amount. From this lead information, the agent typically would prepare introductory materials, and contact the prospective client by telephone to solicit a meeting in the client's home or business. The agent then would meet with the client and attempt to propose financial products most suitable for the particular circumstances.

There have been several attempts in recent years to mass market term life insurance products. A typical format would be as follows. The marketer generally places ads directed to the general public which provide either an (800) telephone number or a return postcard. Through either a return call from the prospective client or the return postcard from the prospective client, lead information is obtained, including the name, age, and smoker versus nonsmoker status of the client, and the amount of term insurance desired. From this lead information, the marketer selects from the term life insurance products available to it. In some instances, the marketer may select several products offering low premiums and provide them to the client, for example, in table format, for selections by the client. The marketer then includes these product selections in a presentation letter which is sent to the prospective client. The presentation letter typically will list as the addressee the client, and it will provide the lead information at the introduction of the letter.

Regardless of the marketing techniques, gaining the consideration of the prospective client may require global follow-up in the form of multiple letters or other contacts, perhaps staged over a period of time selected by the agent as appropriate for the circumstances. Over this time period, the circumstances and needs of the prospective client may have changed, perhaps in ways that are somewhat predictable based on the initial lead information. For example, shortly after purchase of a new home and recording of the mortgage, the new homeowner may have a cash flow shortage which limits the attractiveness of mortgage insurance. Perhaps one year later, however, after the family is settled in and the various expenses of new home ownership have been accommodated, the homeowner may have a better cash flow situation and be far more inclined to purchase this type of insurance. Therefore, a followup presentation letter a year or so after the initial home purchase would be very timely and beneficial.

For those prospective clients who have responded to the presentation materials, the agent might seek additional client information, for example, such as their marital status, whether they smoke, their general health, etc. This would enable the agent to further refine or revisit the financial products selected for consideration by that prospective client. It hopefully results in the final selection of the particular product best suited for that client.

Upon approval by the prospective client, the agent or marketer then prepares an application to the provider for the selected financial product. Depending upon the financial product involved, the agent may be required to follow up, for example, by ordering medial reports, medical exams, etc., for the provider or underwriter.

Marketing processes such as the ones described above have been substantially limited in that they require significant amounts of the agent's or an agent telemarketer's time and attention. Moreover, the market for these products in terms of potential clients numbers in the millions per year. Each client has particularized circumstances and needs, and these circumstances and needs typically vary over time. The variety of financial products, even for a given need, is substantial. Considering all of these factors, the volume of transactions that can be undertaken by a given agent or agent telemarketer is relatively limited.

Attempts have been made in the past to automate limited portions of the various marketing tasks. It is not uncommon, for example, for insurance marketing organizations to maintain a database of potential clients and related client and prospective client information. Most insurance marketing companies also maintain databases of insurance products and related pricing information.

There are some insurance marketing companies, for example, which use computer software to select a set of candidate financial products from a larger set of possible products based upon premium prices. Some of the mass marketing organizations referred to above are examples.

In systems used by several mass marketers selling term life insurance, usually in conjunction with a telemarketer on the telephone, for example, the agent or an assistant enters lead client information into a computer, whereupon the software selects and displays the four or five term insurance policies offering the desired level of coverage for the lowest premium cost. The client information, together with the selected financial product information, then can be used to prepare introductory materials such as a presentation letter to the potential client, as previously described. The product selection and presentation letter preparation are done automatically.

Such known automated systems, however, have been subject to a number of important limitations and drawbacks. For example, they have been limited largely if not entirely to one of two major types (term of permanent) or product, i.e., term life insurance. The ability of these software systems to select from among alternative financial products has been extremely primitive. In most instances, the ability of the system is limited to selections based solely or predominantly on the insurance premium. They also typically require the attention of and interaction with the agent or telemarketer to gather and input the lead client information, and to aid in the selection of the most advantageous products for presentation to the client.

Another important drawback of such known systems is the limited extent to which they personalize the presentation letter or other communications. The presentation letter resulting from such systems usually is a form letter which merely lists the client information at the top of the letter, lists the product or products selected, and provides a brief non-individualized description or explanation of the product. The extent to which the communications take into account the particular circumstances and needs of the individual prospective client including individualized explanations necessary to make an informed decision about the highlighted products, has been extremely limited.

These known systems also are limited in their ability to process large volumes of prospective client communications. This is attributable in large part to their requirement for human input and decision making as a necessary part of their operation, and because of the relatively unsophisticated nature of the known systems.

All of these methods and systems have been limited in that they require a substantial amount of human involvement. This necessitates substantial cost for wages, salaries, benefits, etc., and it can increase the likelihood of errors.

3. Objects of the Invention

Accordingly, an object of the present invention is to provide an apparatus and method for transacting financial product marketing and sales which is capable of being highly automated.

Another object of the invention is to provide an apparatus and method for transacting financial product marketing and sales which is capable of processing relatively large volumes of client communications efficiently.

Another object of the invention is to provide an apparatus and method for transacting financial product marketing and sales which are relatively cost effective compared to prior approaches.

Another object of the invention is to provide an apparatus and method for transacting financial product marketing and sales which are more personalized and individualized to individual prospective clients relative to prior approaches.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, an apparatus and method for transacting financial product marketing and sales is provided. The apparatus and methods according to the invention provide a marked departure from known financial product marketing and sales systems, for example, in that they allow for the virtually complete automation of the tasks traditionally performed by agents and telemarketers in transacting such marketing and sales. Automatically, with little or no human intervention and with essentially no time delays, they can analyze and evaluate client information, incorporate additional information, determine and/or compare client needs with various available financial products to solve needs, select and/or recommend products most appropriate for the individual needs of each prospective client, and prepare personalized and individualized correspondence specifically tailored for each individual prospect to effectively communicate the information to the prospective client that he or she needs to make an informed buying decision.

The apparatus according to one aspect of the invention uses client information from a client to automatically select and present financial products appropriate for the client. The apparatus comprises means for inputting client information relevant to a need by the client for the financial products, for inputting information about the financial products, for inputting ancillary data which excludes the client information and the financial products information, and for inputting decision criteria pertaining to selection from among the financial products. The apparatus further includes means for storing the client information, the financial products information, the ancillary information, and the decision criteria. The apparatus still further includes means for using the client information, the financial products information, the ancillary information, and the decision criteria to select a subset of the financial products. It further includes means for preparing a client communication which identifies the subset of the financial products. The client communication preparing means incorporates a portion of the client information and a portion of the financial products information into the client communication.

The method according to one aspect of the invention also uses client information from a client to automatically select and present financial products appropriate for the client. The method comprises inputting client information relevant to a need by the client for the financial products, inputting information about the financial products, inputting ancillary data which excludes the client information and the financial products information, and inputting decision criteria pertaining to selection from among the financial products. The method also includes storing the client information, the financial products information, the ancillary information, and the decision criteria. This method further includes using the client information, the financial products information, the ancillary information, and the decision criteria to select a subset of the financial products. It further includes preparing a client communication which identifies the subset of the financial products. This client communication preparing step includes incorporating a portion of the client information and a portion of the financial products information into the client communication.

BRIEF DESCRIPTION OF THE DRAWINGS

The accompanying drawings, which are incorporated in and constitute a part of the specification, illustrate a presently preferred embodiment and a presently preferred method of the invention. These drawings, together with the general description given above and the detailed description of the preferred embodiment and method given below, serve to explain the principles of the invention.

DETAILED DESCRIPTION OF THE PREFERRED EMBODIMENT AND METHOD

Figure 1:
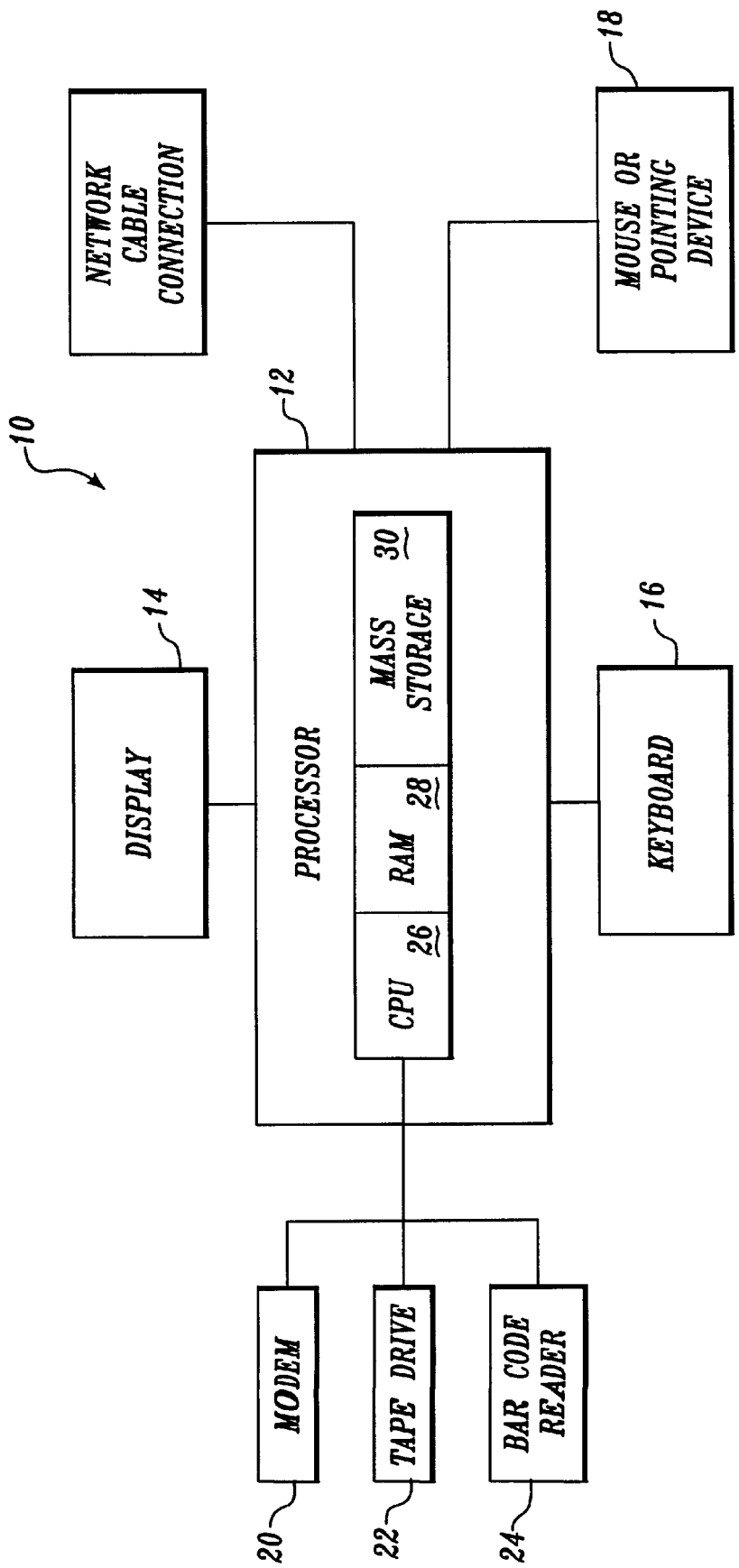
FIG. 1 is a hardware block diagram of the preferred embodiment of the invention.

Reference will now be made in detail to the presently preferred embodiment and method of the invention as illustrated in the accompanying drawings, in which like reference characters designate like or corresponding parts throughout the drawings.

The presently preferred embodiment of the invention comprises an apparatus and method for transacting the marketing and sales of financial products. Financial products as the term is used in this document refers to insurance products such as individual life insurance of all types, tax deferred annuities of all types, health insurance of all types, and the like. Financial products, however, also may include other forms of financial instruments.

For purposes of illustration and not by way of limitation, the financial products discussed in this document in connection with the preferred embodiment and preferred method comprise individual insurance products, such as individual life insurance and health insurance. Examples of life insurance would include individual term and permanent life insurance instruments such as whole life, universal life, level and decreasing term life insurance, and the like. It is to be understood, however, that the invention is not necessarily limited to these products.

A presently preferred embodiment of the apparatus according to the invention is illustrated in FIG. 1. This embodiment comprises a computer system using a networked client-server database system architecture with a number of computer nodes or computer workstations. A network server 10 is shown in FIG. 1. Computer workstation nodes would be very similarly configured. In addition to the server and workstation nodes, system nodes also may include output devices, such as laser printers (not shown). Each of the individual computer workstations or nodes within the system includes a processor 12, a display 14, a keyboard 16, a mouse 22, light pen, or similar pointing device 18, a modem 20, a tape drive 22, and a bar code reader 24.

The processor of each computer node (server or workstation) includes a central processing unit (CPU) 26, random access memory (RAM) 28, and at least one mass storage device 30. The design and configuration of CPU 26 is not limiting, and may include any of the CPU designs sold as standard components with high-end IBM-compatible personal computers or business machines. Such processors include Pentium™ processors from Intel Corp., Santa Clara, Calif., Power PC processors from IBM Corp., and their substantial equivalents, preferably with at least 16 megabytes of RAM and a hard drive with at least about 500 megabytes of storage capacity. The capability and speed of CPU 26 will depend upon the specific application to which the apparatus is to be put, the volume of data to be handled, etc. In the preferred embodiment of FIG. 1, the CPU of the principal server comprises a 100 MHz Pentium-based processor with 32 megabytes of RAM and a 2 gigabyte hard drive. The CPUs of the network workstations comprise 90 to 100 MHz Pentium-based processors with at least about 16 MHz of RAM and at least about 500 megabytes of hard disk storage capacity.

Display 14 should be compatible with the processor, and preferably should have a resolution of at least about 800× 600 pixels. Other than these requirements, many commercially-available Super VGA monitors would suffice.

Keyboard 16 is a standard IBM PC-compatible keyboard which is compatible with the processors. Keyboard 16 comprises a means for the system user to selectively input information, decisional criteria, module instructions, and the like into the system where manual input is called for.

The mouse, light pen, track ball or similar pointing device 18 is used to navigate the graphical user interface of the system, which is designed to increase the ease of use of the system, as will be described more fully below. It also comprises means for inputting information into the system, particularly where graphical interface environments are used in implementation. These devices may be obtained from commercially-available sources as off-the-shelf components.

Modem 20 is used for communicating with computer systems remotely from processor. The design of modem 20 also is not limiting, and its specific design will depend upon the design of processor, the design and configuration of the computer or computers to be communicated with, and similar generally known factors in a given application. In the preferred embodiment of FIG. 1, modem 20 comprises a 28.8 baud modem which is compatible with processor 12, such as the Model Sportster 28.8, commercially available from U.S. Robotics Inc.

Tape drive 22 is optional, but may be used for inputting bulk files and lists, as described in greater detail below. The specific design and configuration of tape drive 22 also will depend to a large extent on the design and configuration of other system components, and on the particulars of the application. In the preferred embodiment of FIG. 1, tape drive 22 comprises a high-capacity digital tape device which may be obtained as an off-the-shelf component from commercial suppliers.

Bar code readers may be used to speed manual input of data and also to record responses and other correspondence from prospective clients. They should be industry-standard readers capable of reading the major bar code formats, such as Code-39 bar codes, and inputting the scanned information to processor 12. An optical scanner also may be provided as an optional input device, as described in greater detail below.

Figure 2:
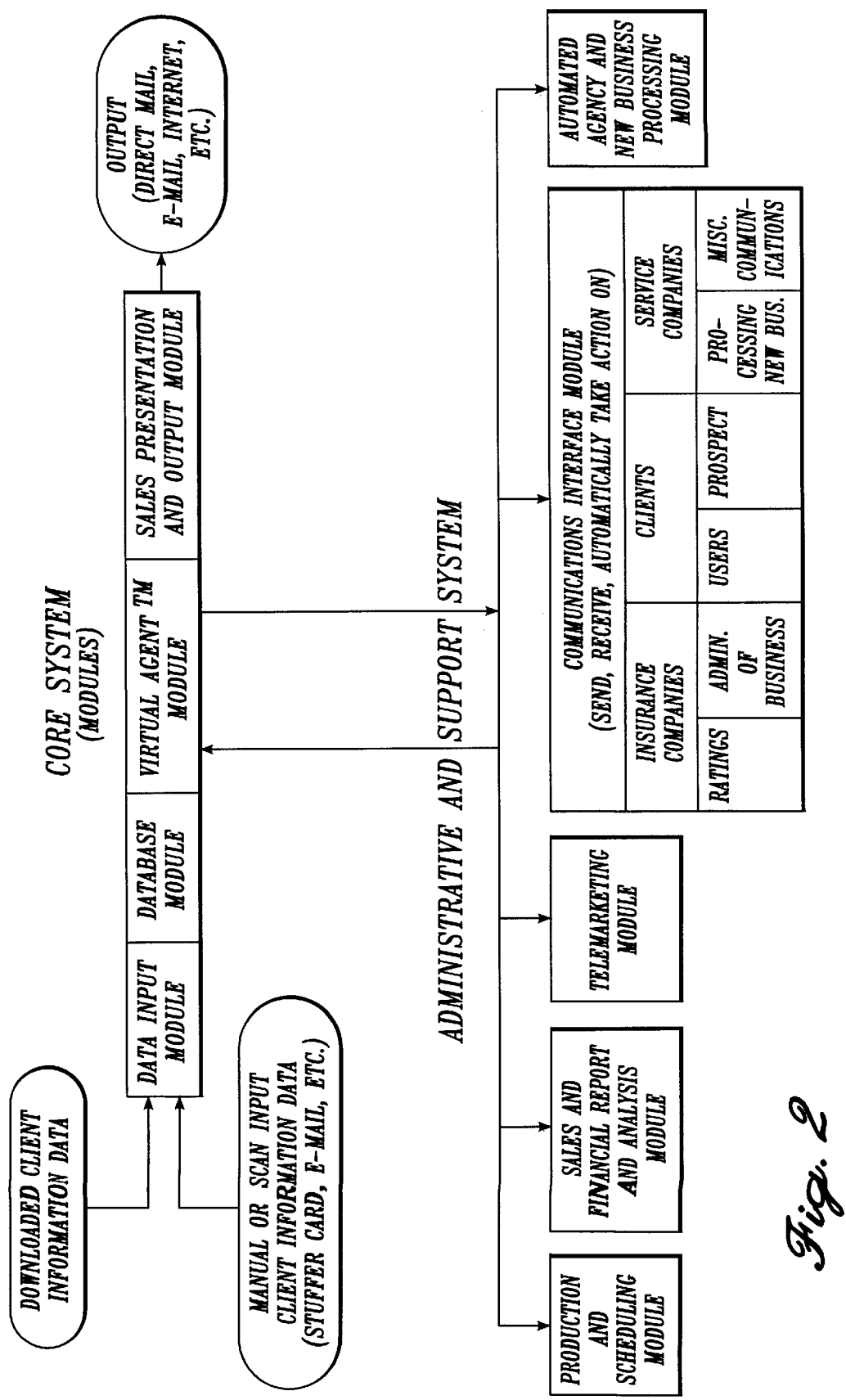
FIG. 2 is a flow chart diagram illustrating the preferred embodiment and method of the invention.

In accordance with the preferred embodiment and preferred method of the invention, processor 12 has resident within its memory system computer software, a flow diagram of which is shown in FIG. 2. The software has a "core" system for transacting financial product marketing, and an "administrative and support" system for supporting the core system, facilitating the marketing program, providing administrative and management reports and functions, and preferring other tasks. The core system includes a plurality of modules, including a data input module, a database module, a Virtual Agent™ module, and a sales presentation and output module. The administrative and support system includes a production and scheduling module, a sales and financial report and analysis module, a telemarketing module, a communications interface module, and an automated agency and new business processing module. Each of these systems and modules will be described in greater detail below.

The Data Input Module

The data input module performs tasks related to inputting prospective client information into the system. The types of prospective client information to be inputted will vary, depending, for example, on the types of plans and products involved, the types of prospective client information available, etc. Typical examples for individual life insurance might include the prospective clients name, address including zip code, age, and whether he or she smokes. Where individual mortgage life insurance is involved, the available, prospective client information may include only name or names on the mortgage loan, address, mortgage date, and mortgage amount.

Product-related information also would be entered into the system. Examples of this type of data or information would include product-related descriptions, issue constraints, product prices, etc. Ancillary data also may be entered into the system using the input module. Such ancillary data would include virtually any type of data or information useful for the system in performing its intended function, but by definition excluding client information about specific clients and product-related information about products potentially presentable by the system. Examples of such ancillary data or information would include statistical information, geo-code data, and the like.

The means of inputting may vary depending on the format in which the information is available. With reference to FIG. 1, for example, information may be directly entered using keyboard 16. Diskette drives (not shown), for example, as would come as standard equipment with the types of processors noted above also may be used. In some instances, bulk lists of client records may be available by tape, in which case in which case tape drive 22 may be used. Some records are available on non-resident databases. This is increasingly the case as online networks such as the Internet gain widespread use and acceptance. In such instances, prospective client information may be received via modem 20.

Figure 3:
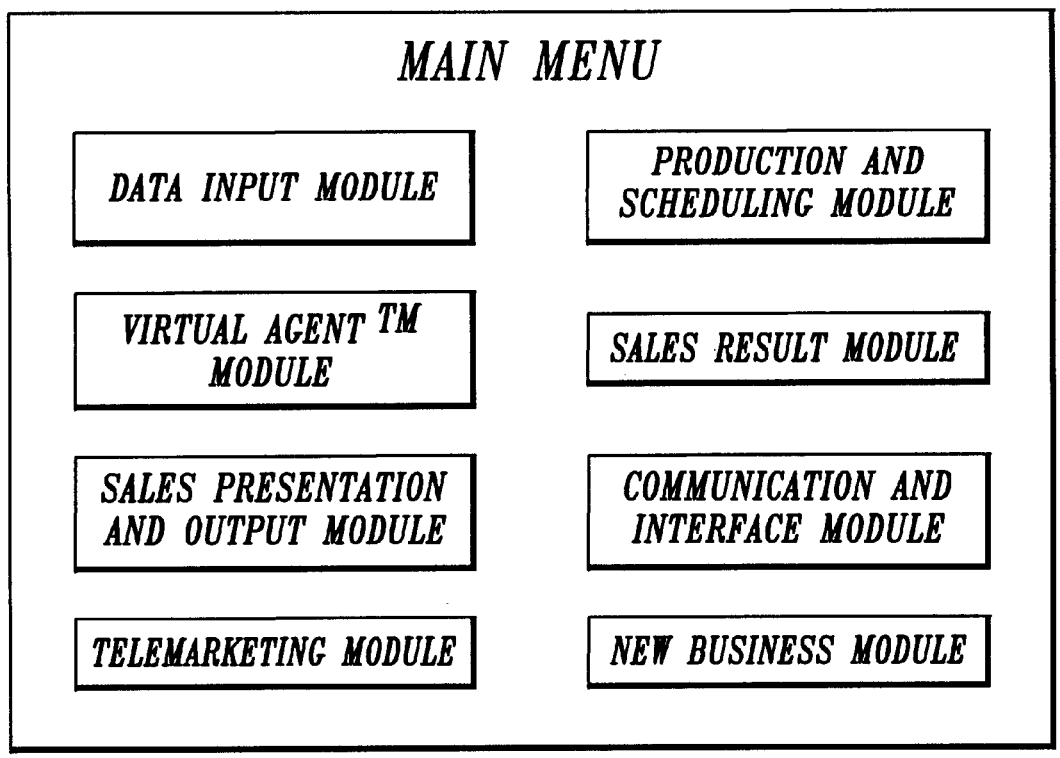
FIG. 3 provides an illustrative main menu for the system depicted in FIG. 2.

In accordance with the preferred embodiment and method, an example of a main menu for the system is shown in FIG. 3. This menu includes a plurality of buttons corresponding to the modules of the system as depicted in FIG. 2.

Figure 4:
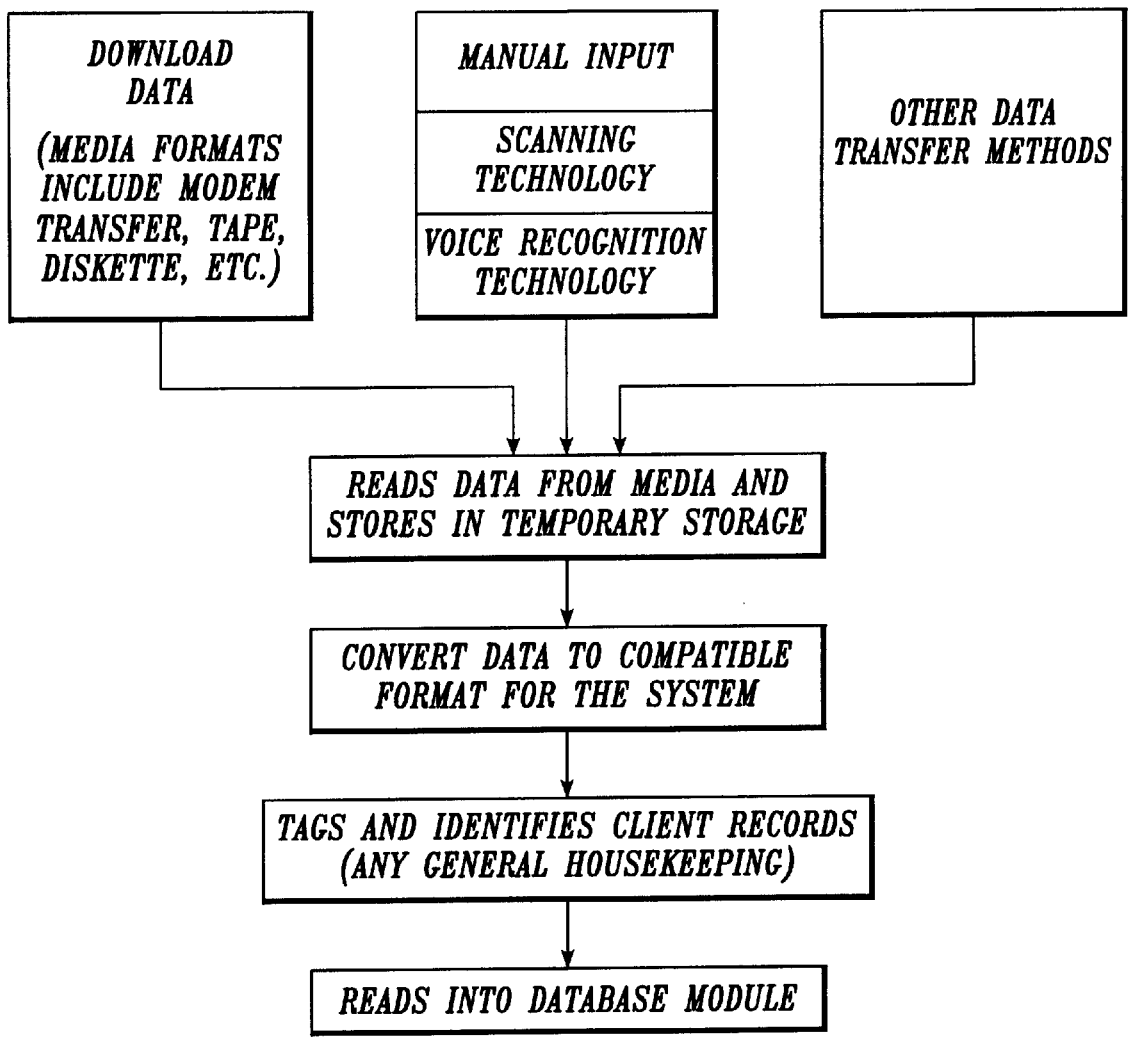
FIG. 4 is a flow chart diagram illustrating the data input module of the preferred embodiment and method of the invention.

An example of the organization and task flow of the data input module shown in FIG. 4. As noted above, data may be entered manually or automatically. For example, information may be entered using scanning technologies. For example, bar codes may be used on advertisements, information cards and other documentation. Scanners such as those commercially available for use with processor 12 may be used to read the bar-coded information. Similarly, an optical scanner may be used to scan an entire page or document, and standard image processing software may be used to read information from the scanned client information from the scanned input.

The invention is not, however, limited to these input modes, and others may be used. For example, as voice recognition technology develops, there very well may be the ability to input client information merely by voicing that information into a voice recognition device, which would translate the voice information into digital client data.

The task of automatically or semi-automatically performing the functions of an agent in marketing and selling financial products generally will require that the system receive or gather on its own essentially the same client information that would be made available to an agent. For a given potential client, the system is adapted to retrieve client information and, depending upon the circumstances, other information as well. Inherent advantages of using an automated environment to undertake these tasks is the tremendous speed with which computers can retrieve, process and store large volumes of information.

The data input module of this embodiment and method inputs data into the system from one or more of the input devices for the system, such as modem 20, tape drive 22, or bar code reader 24. The details of the data input module will depend to a certain extent upon the type of data to be inputted. For example, input data for a set of potential mortgage insurance clients might include the mortgagee's name, the address of the mortgaged property, and the amount of the mortgage. Input data for potential life insurance clients might include the name, address, age, and marital status of each potential client.

With further reference to FIG. 4, as data is imputted, the data input module stores it in a temporary storage area within processor 12. If necessary or appropriate, the data is converted to a format compatible with the system. For example, as is known in the database arts, it is sometimes necessary to import or export files to convert one database format to a pre-defined database structure. In this embodiment, the data input module also may tag and identify client records as they are inputted, and perform general and routine "house keeping" tasks on the data. Once these tasks have been performed by the data input module, the properly-formatted client information is transferred to the database module. In the preferred embodiment, the database module comprises a relational database essentially equivalent to commercially-available database packages.

The Database Module

The database module stores client information for general use by the system, as explained more fully below. The database stores client information so that each client is represented by a record in the database, and the various items of information pertaining to a given client are contained within fields under the record for that client. Examples of the structure and contents of a client database for life insurance, for example, may include the following fields:

Name

Address (including zip code)

Age

Tobacco user v. non-tobacco user

Marital Status

General Health

The contents of a representative client database record for marketing of individual mortgage life insurance may include the following:

| Borrower | Co-Borrower |
|---|---|
| Name | Name |
| Address | Address |
| (including zip code) | (including zip code) |
| Age | Age |
| Tobacco user v. non-tobacco user | Tobacco user v. non-tobacco user |
| Marital Status | Marital Status |
| General Health | General Health |

The database module also includes information other than client information. For example, this module typically would include a listing of the financial products. This information typically would include not only the identification of the product, but information about pricing and "issue constraints" for the product. Issue constraints as used here refers to limitations on the availability of the product, e.g., age range constraints, amount constraints, and so forth. The product-related database also may include descriptions and explanations of the products. This will be explained in greater detail in connection with the sales presentation and output module.

The Virtual Agent™ Module

The Virtual Agent™ module uses client information and its own decision logic as described more fully below to select the plan or plans and the financial product or products which best meet a specified set of decision criteria. The Virtual Agent™ module embodiment and method also are designed to perform many of the analytical and decision making tasks that would normally be performed by an agent. This would include, for example, but is not limited to analyzing the particular financial product needs, circumstances, and demographics of each client, analyzing a variety of plans and financial products which are calculated to meet the needs of the client, and applying decision making criteria to select from among those plans and products the ones most suitable for the client based on the decision making criteria. Within these general guidelines, however, the Virtual Agent™ module provides tremendous flexibility. It may be adapted, for example, to handle a wide variety of classes of financial products, such as term life insurance, permanent life insurance, combinations of term and permanent life insurance, health insurances, disability insurances, long term care insurances, and the like. The Virtual Agent™ module can accommodate any type of client information that can be incorporated into the client database. In addition, the Virtual Agent™ module has great flexibility in the specific analytical and decision making methods and procedures used. Specific yet merely illustrative examples are provided below.

Figure 5:
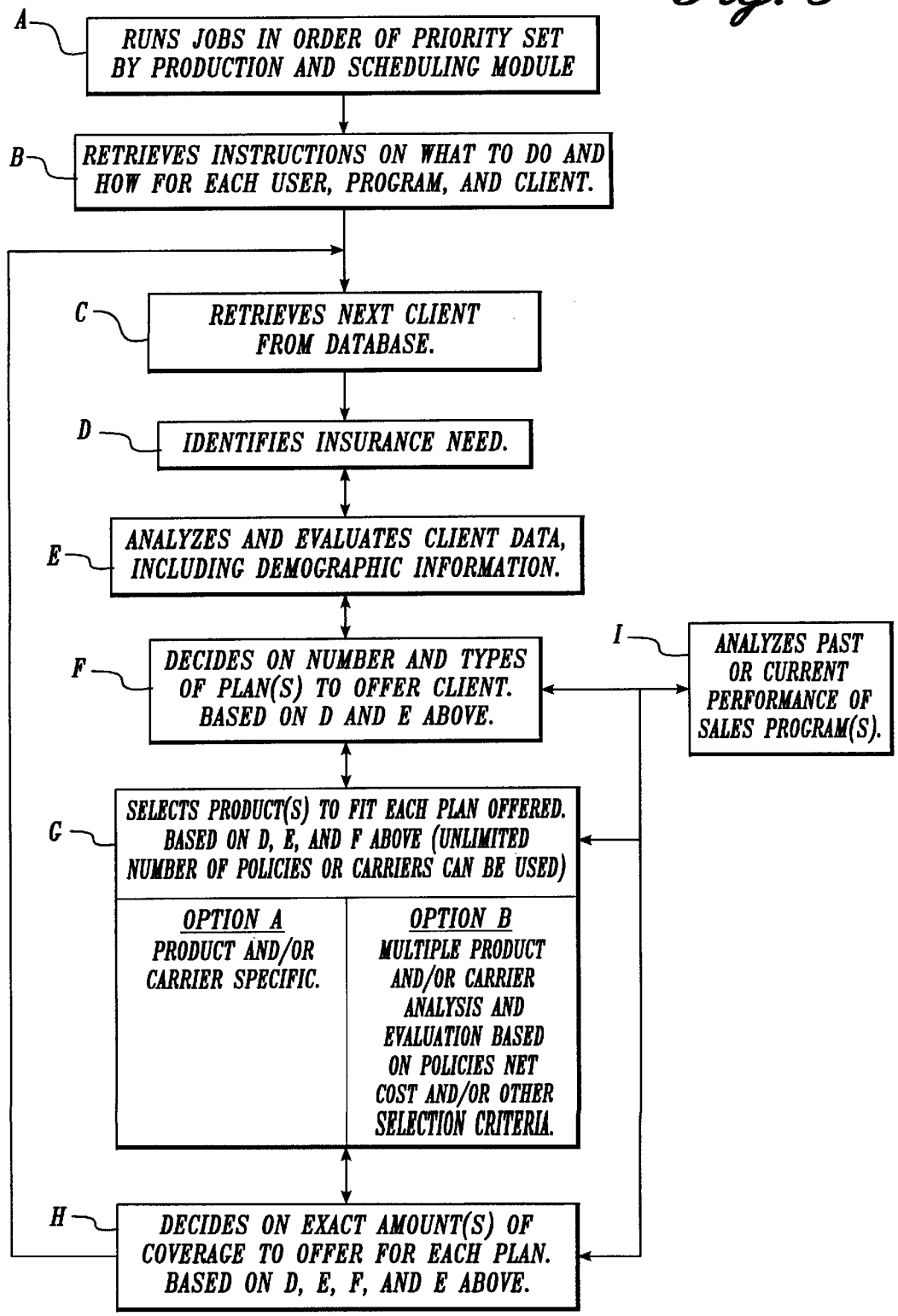
FIG. 5 is a flow chart diagram illustrating the Virtual Agent™ module of the preferred embodiment and method of the invention.

A flow chart depicting the general organization and logic flow of the Virtual Agent™ module for the preferred embodiment and method is presented in FIG. 5. Note, however, that steps D through I of FIG. 5 need not necessarily be carried out in the order shown. The Virtual Agent™ module flow process retrieves or otherwise receives client information from the database module and from other areas of the system. The Virtual Agent™ module is described herein as processing data files sequentially, one record at a time. This is not necessarily limiting. For example, the Virtual Agent™ module may be configured so that it processes more than one record at a time through such generally known approaches as multi-tasking or parallel processing.

The type of information retrieved by the Virtual Agent™ module will depend upon the type of analysis under consideration, and for which the system has been adapted. Illustrative examples of such input data is described above with reference to the data input module.

In Step B of Virtual Agent™ module processing according to this embodiment and method, the Virtual Agent™ module retrieves the set of analysis instructions and decision making criteria to be used in processing the retrieved set of client records. Examples of these analytical instructions and decision making criteria will be presented below.

In Step C of Virtual Agent™ module processing according to this embodiment and method, the Virtual Agent™ module retrieves or otherwise receives a set of client records from the client database. Depending on the particular application, the Virtual Agent™ module may undertake some pre-sorting or other manipulation of the client information prior to the principal analysis of it. For example, there may be categories or items of information within a given a client record that are not utilized in the analysis and decision making procedures to be undertaken by the Virtual Agent™ module in that application. Therefore, it may be appropriate to modify the retrieved client records to eliminate such categories or items before further processing in undertaken in the Virtual Agent™ module.

In Step D of Virtual Agent™ module processing according to this embodiment and method, the module identifies, evaluates and analyzes the needs of the client among other reasons for plan(s) and product(s) selection of a given type. For example, in the context of individual mortgage life insurance, the client would want to pay off the loan in the event of the mortgagee's death.

In Step E of Virtual Agent™ module, the module analyzes the client information for that record, including demographic information.

In Step F of Virtual Agent™ module processing, the module uses the analyzed client information and applies it against the decision making criteria.

To illustrate the types of decision making procedures and criteria which may be embodied in the Virtual Agent™ module, we will continue to use the example of individual mortgage life insurance. Pursuant to the example, assume that each client record includes the address of the property subject to the mortgage, the amount of the mortgage, the monthly mortgage payments and the following information for each borrower and co-borrower: Name, age, and gender. As part of the analytical and decision making criteria information retrieved by the Virtual Agent™ module, a set of scenarios are provided for characterizing the client and the surrounding circumstances. Illustrative examples of the scenarios would include the following:

Scenario 1: Single individual borrower.

Scenario 2: Two borrowers of different gender, which may include a husband and wife, business partners, etc.

Scenario 3: Two borrowers of the same gender, which may include a parent and child, siblings, business partners, gay partners, etc.

Figure 6:
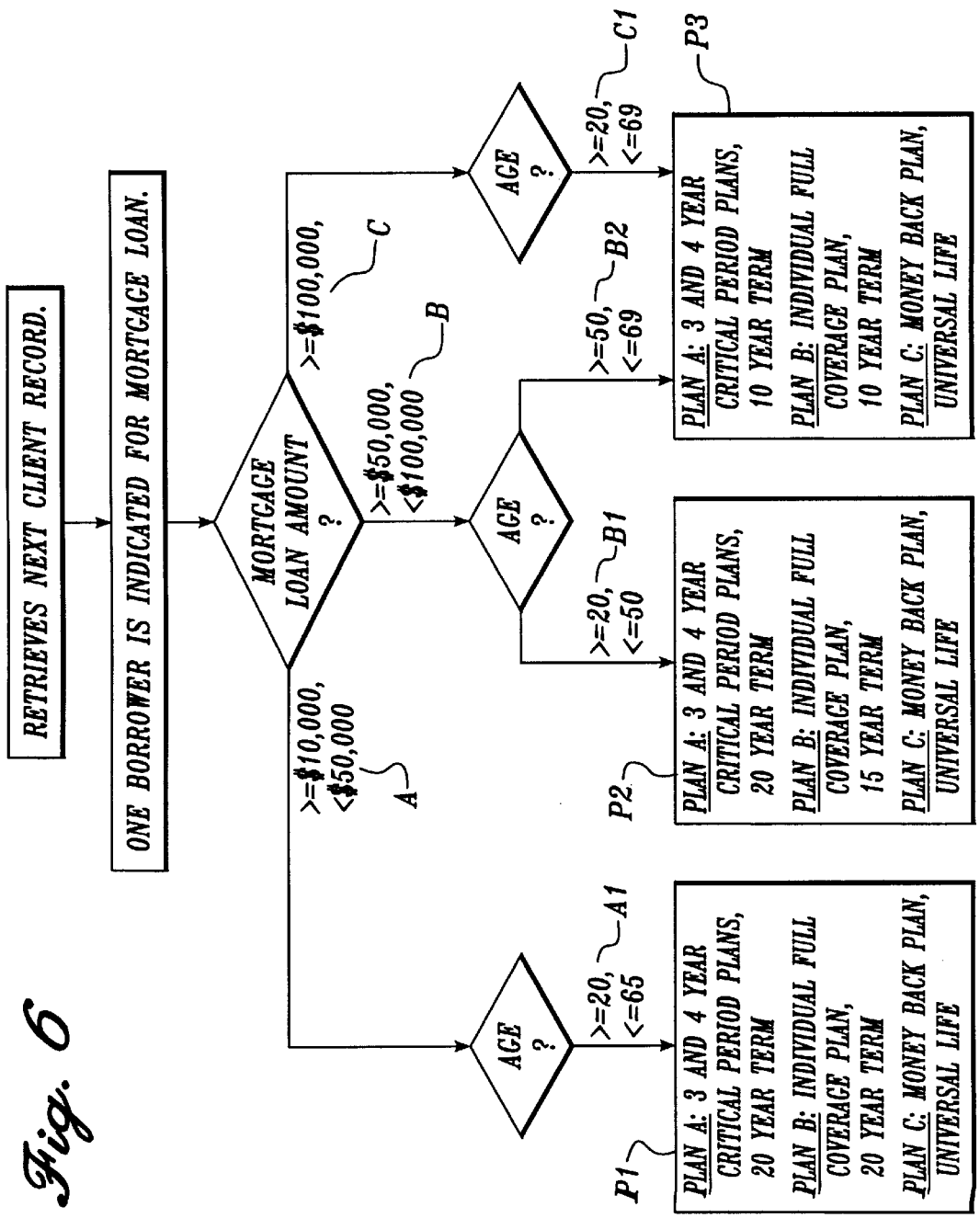
FIG. 6 is a flow chart diagram illustrating a specific example of the organization and flow of the Virtual Agent™ module specifically pertaining to a individual mortgage life insurance program.
Figure 7:
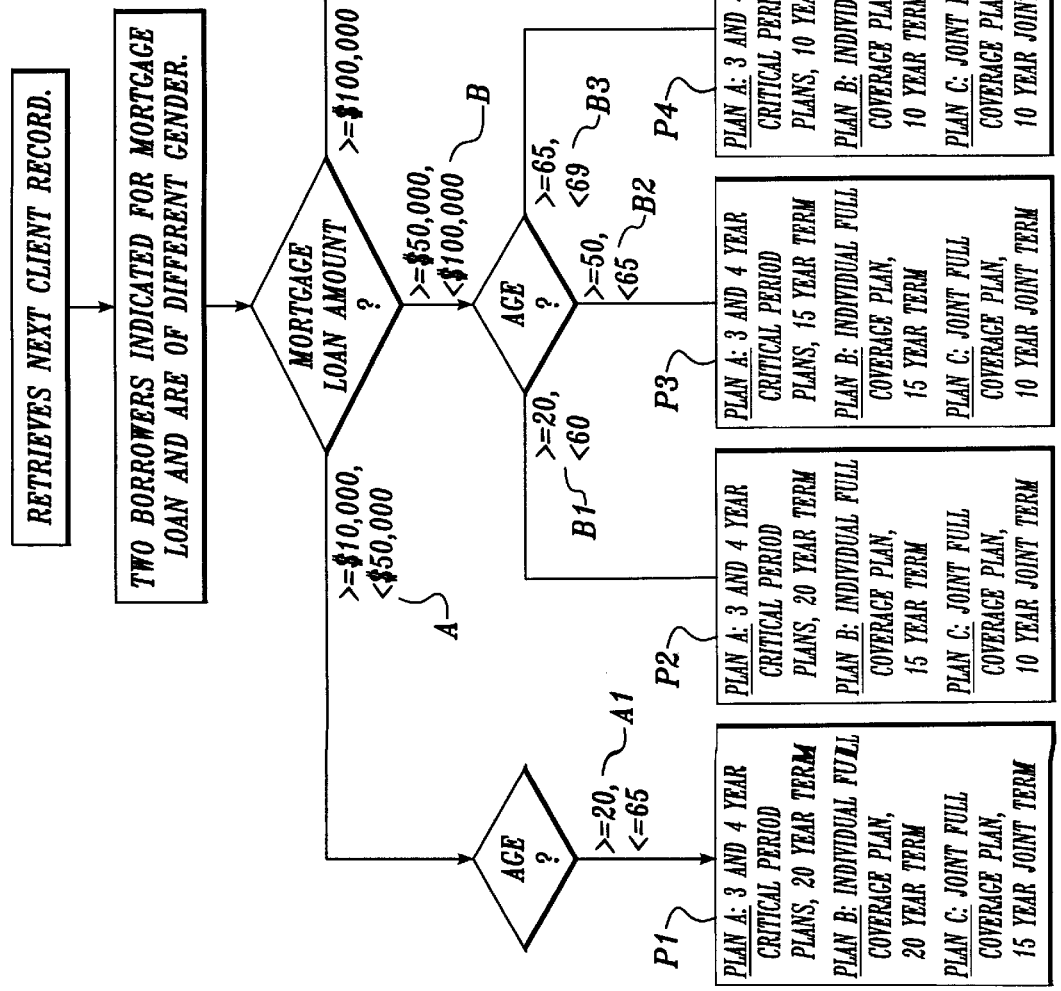
FIG. 7 is a flow chart diagram illustrating another specific example of the organization and flow of the Virtual Agent™ module specifically pertaining to a individual mortgage life insurance program.
Figure 8:
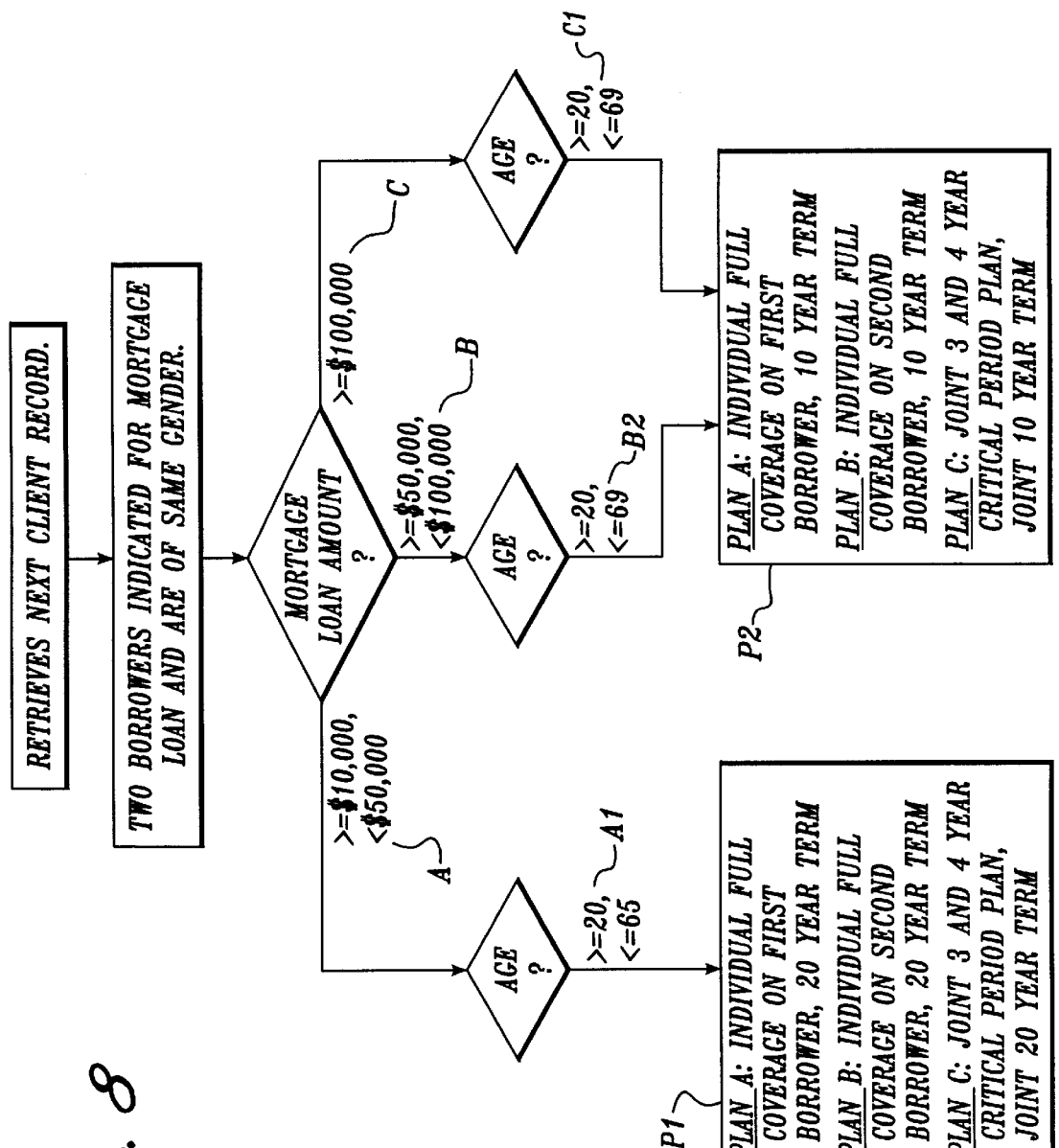
FIG. 8 is a flow chart diagram illustrating a specific example of the organization and flow of the Virtual Agent™ module specifically pertaining to an individual mortgage life insurance program.

As part of the retrieved decision making criteria, the Virtual Agent™ module would retrieve the information depicted graphically in FIGS. 6–8. If the client record under consideration reflected a single borrower, the Virtual Agent™ module would employ the decision making criteria reflected in FIG. 6. According to those criteria, the Virtual Agent™ module would determine which of three mutually exclusive categories the mortgage falls based on the loan amount. In this example, loan amounts of at least $10,000 but less than $50,000 would fall into category A. Loan amounts of at least fifty thousand dollars but less than one hundred thousand dollars would fall into category B, whereas loan amounts of at least one hundred thousand dollars would fall into category C. At a second level of decision making, the age of the borrower would be considered. For borrowers in category A between the ages of twenty (20) and sixty-five (65), the Virtual Agent™ module would select product package number 1 (P1), which includes three alternative plans, i.e., plan A, plan B, or plan C, as described in the box for package P1 in FIG. 6. Note that for any age or mortgage loan amounts outside the ranges indicated in FIG. 6. No proposal would be made because of issue constraints.

To the extent the client record falls into category B based on loan amount, the agent borrower similarly would be used to further categorize the record. In this illustrative example, category is segregated into two age categories, i.e., B1 and B2. Category B1 includes borrower of at least twenty (20) but less and fifty (50). Category B2 includes ages greater than fifty (50) but less than sixty-five (69). Those records qualifying under category B1 would result in the proposal of a package P2. This package P2 would include three optional proposals, as described in the box for package P2 in FIG. 6.

For category B2, a package P3 would be proposed. Package P3 similarly includes three optional plans, as described in the box for package P3 in FIG. 6.

For those records falling within category C, i.e., involving loan amounts of at least $100,000, package P3 would be proposed.

Also under Step F of FIG. 5, the Virtual Agent™ module would analyze each client record to recognize scenario #2, i.e., two borrowers of different gender. The decision making criteria and processing undertaken for records qualifying under scenario #2 is depicted in FIG. 7. Processing under this scenario would be very similar to that described above with regard to FIG. 6. At the initial level, each record would be categorized based on loan amount. Segregation at a second level would occur based on age of the first or principal borrowers.

Similarly to FIG. 6, those clients qualifying under scenario #2 and falling within category A1 would be proposed a package P1 which includes three optional plans, i.e., A, B and C. A package P2 would be proposed to those clients qualifying under category B1 in FIG. 7. For those clients qualifying under category B2, a package P3 would be proposed. For those clients qualifying under category B3 of FIG. 7, a package P4 would be proposed. For clients qualifying under category C1, package P5 would be proposed. For those clients qualifying under category C2, a package P6 would be proposed.

Where the client record indicates there are two borrowers of the same gender, scenario #3 would be implicated. The decision making criteria and processing for this illustrative example is shown in FIG. 8, which follows the same logic and processing of FIGS. 6 and 7. In Step F of the Virtual Agent™ module flow depicted in FIG. 5, the module decides on the number and types of plans to be proposed to the client. This decision is based upon the insurance needs of the clients as identified in Step D above, on the client information in the client record, and possibly on other information such as demographic information, geo-coding information, etc. This step involves making an informed intelligent decision regarding the possible solution or solutions to the product needs of the client. Factors which may be considered by the module in this selection process may include the client demographic information (e.g. age, gender, tobacco usage, and occupation), mortgage information, financial information such as income, marital information, existing policy information, family-related information, and other factors selected by the system user and incorporated into the Virtual Agent™ module decision making criteria.

In Step G of the Virtual Agent™ module flow of FIG. 5, the module selects the product or products which satisfy the decision making criteria being employed in the module. Under this Step G, the Virtual Agent™ module draws from the available product pool the most appropriate product to fit each plan selected as a candidate in Step F. Preferably the Virtual Agent™ module has the ability to select from a large number of products and product providers. In performing this Step G the Virtual Agent™ module may take into consideration factors such as the premium for the product, the compensation paid to the system user or other provider including primary and secondary compensation, legal issues, underwriting requirements, demographic information pertaining to the client, and the net cost of premiums over a specified period of time. As to legal issues, all local, state, and federal laws regarding insurance sales, for example, and additional constraints imposed by product providers may be considered.

In this illustrative example, two methodologies may be employed for selecting the product, i.e., a product and/or product provider-specific methodology and a "best policy" analysis methodology. Both of these methodologies taken to account the information from Steps D, E, and F. The first methodology considers each of the various factors which may be used to evaluate the attractiveness of that product for the particular client. Such factors considered by the Virtual Agent™ module may include the premiums, issue constraints, compensation paid to the system user, product provider, etc., and underwriting requirement.

The "best policy" methodology evaluates and analyzes a potentially large number of product providers and products which best meet a specified set of criteria, for example, by picking the product having the lowest premium for the client.

In Step I of Virtual Agent™ module processing according to this embodiment and method, the module analyzes the past or current performance on a real-time basis of various sale programs. It identifies on a real-time basis who is buying on any geographic or any demographic basis. This step involves determining what the individual client is most likely to buy, making the end users aware of that fact, recommending changes, and if given permission, or if appropriately coded, automatically implementing the changes, which may occur even during the running of the module.

To better illustrate the organization, operation and flow of the Virtual Agent™ module, another example, i.e., one involving the logic associated with the marketing of life insurance, will now be explained with reference to FIG. 9. Step C, D, E, . . . of FIG. 9 correspond to Steps C, D, E, . . . respectively, of FIG. 5. In Step C, the Virtual Agent™ module retrieves a client record for analysis.

In Step D, the module identifies the insurance need for the client, e.g., to replace lost income.

In Step E, the module analyzes and evaluates client information for this client, including all pertinent client demographics available to the system. The system also may retrieve and use additional demographic data, for example from a geo-coding module.

The database module of this preferred embodiment includes a geo-coding module which includes geo-coding data. This geo-coding data can be organized by zip code and includes statistical information regarding location, average income, average education, average property values and the like within that zip code area. It can obtain in real-time any field of demographic information for use contained within the United States census.

Figure 9:
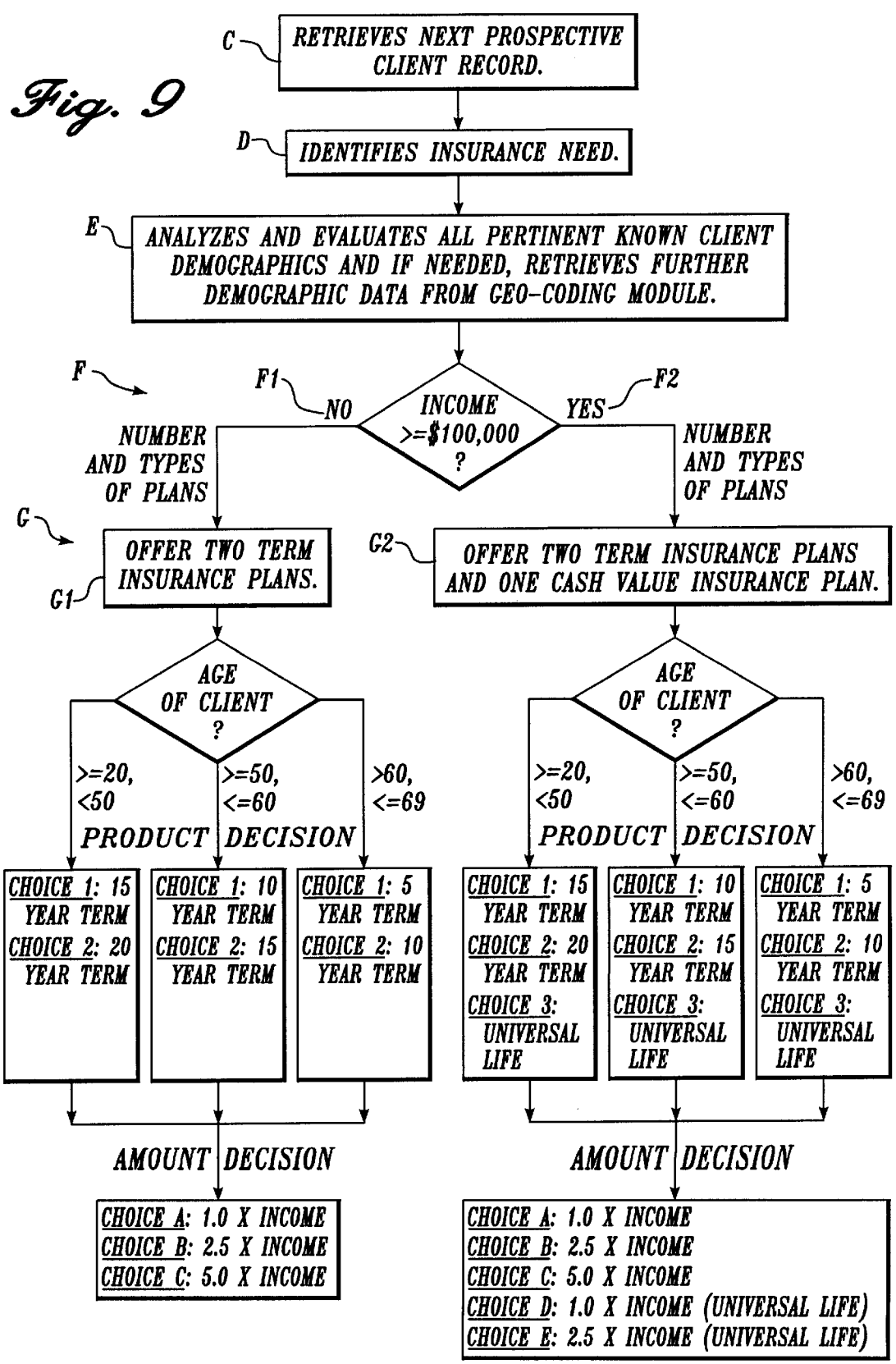
FIG. 9 is a flow chart diagram illustrating a specific example of the organization and flow of the Virtual Agent™ module specifically pertaining to a basic individual life insurance program.

In this illustrative example shown in FIG. 9, Step F involves segregating client records by annual income. For client records reflecting an annual income of less than one hundred thousand dollars, processing continues along a path F1. For client records reflecting an annual income of at least one hundred thousand dollars, processing proceeds along a path F2.

In Step G of FIG. 9, clients falling under category F1 are offered two optional term insurance plans, depending on the age of the client. For those clients having an income of less than $100,000 (path F1), two term insurance plans would be proposed, but specifically which two would depend upon the age of the client. For clients at least twenty (20) years old but younger than fifty (50) years, their choices would include a 15 year term policy and a 20 year term policy. For clients aged at least fifty (50) but less than sixty, the choices would include a 10 year term policy and a 15 year term policy. For clients older than sixty (60) but not over sixty-nine (69), the two choices would include a 5 year term policy and a 10 year term policy. In each of these instances, three separate coverage amounts for each of the two policies proposed would be presented.

In this illustrative example, the system user may select between an Option A and an Option B. Under Option A, only specified products and/or specific product providers may be considered. Under Option B, a variety of products and product providers may be considered in selecting the appropriate plans and products for selection.

In Step H of the Virtual Agent™ module flow of FIG. 5, the module selects a specific amount or amounts of coverage to propose under each plan. This decision is based on the information as compile in Step D, E, F and G as described above.

These three coverage amounts are determined by multiplying the annual income by a multiplier and rounding (e.g., to the nearest $5,000 or $10,000). The multiplier for path F1 would be 1.0, 2.5 and 5.0 for plan A, B and C, respectively.

For those clients have annual incomes in excess of at least one hundred thousand dollars (path F2), the Virtual Agent™ module optionally proposes two term insurance plans and one cash value insurance plan. The specific plan again depend on the age of the client among other things. For clients at least twenty (20) but less than fifty (50) years old, the choices include a twenty year term policy, a 15 year term policy, and a universal life policy. For clients at least fifty (50) but no more than sixty (60), the choices include a 10 year term policy, a fifteen year term policy, and a universal life policy. For clients older than sixty (60) but less than sixty-nine (69), the choices proposed are a 5 year term policy, a 10 year term policy, and a universal life policy. In this example the Virtual Agent™ module also selects an amount of coverage based on income. Specifically, five alternative levels of coverage are proposed corresponding to annual income multipliers of 1.0, 2.5 and 5.0 respectively.

Sales Presentation and Output Module

The sales presentation and output module ("output module") uses the information obtained from the Virtual Agent™ module and optionally from other sources to generate, design, individualize and particularize all of the client communications. Presentation letters, followup letters, and reminders would be examples of such client communications. The output module automatically prepares and outputs a client communication, for example, in a form of a presentation letter, which provides information sufficient to enable the client to make informed, intelligent decision regarding the purchase of the plans or products selected by the Virtual Agent™ module. The Virtual Agent™ module creates these client communications in a manner using a format which personalizes and individualizes the information presented to the client.

This output module does not merely insert client information in the header of the client communication, nor does it merely import product information from the generic product information directly from the product-related database into the communication. The output module instead selectively uses substantial portions of client information, product information, and in many instances other information as well to generate a particularized communication tailored to the particular client for whom the communication is to be sent.

Client communications generation involves organizing, formatting and outputting client communications using information received generally from the Virtual Agent™ module. As explained, the Virtual Agent™ module uses client information, information about available financial products, and perhaps other available information to recommend products, plans, and the like specifically tailored to each client. The output module allows the system user to define a particularized communication format for classes of customers, such as for potential individual mortgage insurance clients. It then generates highly individualized communications specifically tailored to present that client with individualized plan and product presentations, reminders, followup, etc.

The output module is adapted to present its output in a variety of forms. For example, the output can be displayed on display 14 for visual inspection by the system user, client, etc. The output also may be in the form of a printed letter or document using a printer such as a laser printer. It may be in the form of an automated document or data file or both, and it also may be in a form suitable for transmission, for example, over modem 20 or to a network with or without simultaneous video conferencing.

The particular format of client communication outputs will depend upon the specific circumstances, such as client demographics, plans and products offered, and marketing objectives of the particular application. An Example of a presentation letter prepared using the preferred system and method and employing the individual mortgage life insurance program outlined using a procedure essentially as described above with respect to FIGS. 6–8 is attached as Appendix 1. An example of a presentation letter prepared using the preferred system and method and employing the individual life insurance program outlined using the procedure essentially as discussed above with respect to FIG. 9 is attached as Appendix 2.

Figure 10:
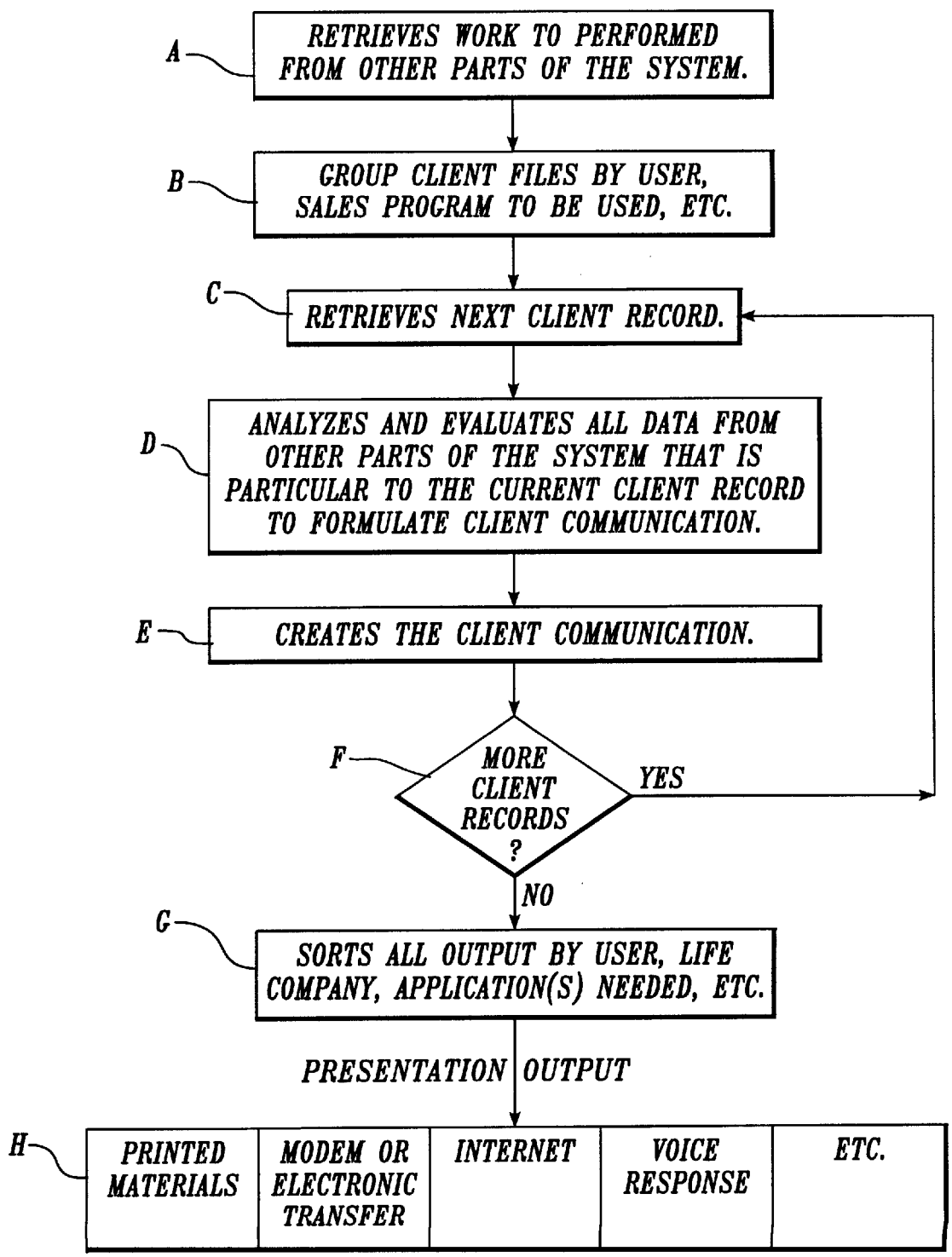
FIG. 10 a flow chart diagram illustrating the organization and flow of the sales presentation and output module of the preferred embodiment and method as depicted in FIG. 2.

FIG. 10 presents an illustrative flow chart diagram of the logic flow of the output module for the preferred embodiment and the preferred method. In Step A of FIG. 10, the output module retrieves work to be performed from other parts of the system. For example, after a set of records has been processed with the Virtual Agent™ module as described above, the output module would retrieve those files and store them in temporary memory locations so that a presentation letter, for example, can be prepared for each client record.

As part of Step A, the output module retrieves instructions which would be used in preparing the presentation letter or other communications output. The specific nature and content of these instructions will depend upon the specific type of presentation to be made and the specific format for the presentation. The specific examples to be presented below also provide a description and explanation of the types of the instructions used by the output module in preparing communications.

In Step B of FIG. 10, client files are grouped by user, or by the sales program to be used, or by other criteria specified by the system user. Grouping criteria preferably would be selected by the system user during a setup phase, and would remain unchanged indefinitely until a different set of grouping criteria is desired.

The processing of a set of client records to generate and output a corresponding set of presentation letters or other communications primarily takes place between Step C and F of FIG. 10. More specifically in Step C the output module receives a client record for processing. In Step D, the output module analyzes and evaluates the client information from the client record, the corresponding output from the Virtual Agent™ module for that client record, and other data or information needed to construct the communication. Other forms of data or information which might be retrieved at this point could include geo-coding data, demographic data, and the like.

In Step E, the output module uses the instructions for preparation of the communication, together with the data and information from Step D, to prepare the presentation or other communication. The specific manner in which the instructions and the information are used to construct the presentation will vary depending upon the application, the specification of the system user and other factors. To better understand and appreciate this aspect of the invention, however, we will refer to the presentation letter attached hereto as Appendix 1, which is a sample presentation letter presenting individual mortgage life insurance.

The sample presentation format used for this letter includes eight sections. Each section may or may not use information variables and insertion logic to construct the text or presentation of the section, and decisional logic may or may not be employed to determine what if any states the variable is to assume. In other words, the instructions and/or decision logic may be employed in various places throughout a section and throughout the entire communication to adapt the communication to the particular circumstances of the client. The following discussion will provide more concrete examples of these features.

The output module may include any one or any combination of at least four types of logic or variables, including (1) customer information logic, (2) words/paragraphs/sentence logic, (3) product/plan/amount of coverage/payment mode/underwriting logic, and (4) pricing logic. Logic or variable, as referred to herein, may involve the placement of a particular word, number, phase, or item of information in a particular place within the communication. Insertion of such items within a blank space in a sentence would be an example. Customer information logic refers to the place of the selective placement of client information in a particular location, blank space, or gap in a communication. Words/Paragraphs/Sentence Logic ("Word Logic") refers to the insertion of Words, Paragraphs, Sentence etc. other than client information, product type and related information and pricing information, which is selectively placed in a specific location, blank space or gap in the communication. Products/Plans/Amount of Coverage/Payment Mode/Underwriting Logic ("Product Logic") refers to information pertaining to any of these topics, which is to be placed in particular location, blank space or gap in the communication. Pricing Logic refers to pricing information that refers to the product, which is to be positioned in a particular location, blank space or gap in the document.

The purpose and function of each of the illustrative sections as created by the output module will now be outlined and discussed.

Section 1 describes the "need" for the proposed product and why the proposal or offer is being made to the client. In the individual mortgage life insurance application, the need is straightforward, i.e., to provide funds to pay the mortgage or liquidate it upon the death of the mortgagee so the family may retain ownership of the home without the burden of a mortgage. In the individual life insurance application, the need may be less apparent because there are so many individual uses of the product, a prime example of which is replacement of lost income.

In terms of variables, in this section, for example, the client name, address, the loan number and the loan amount constitute customer information logic gleamed from the client record. The entry at the top of the letter at "Co-Mortgager" as well as the name of the company of the third paragraph of the letter constitute word logic. The mortgage loan amount in the fourth paragraph of the letter again constitutes customer information logic.

Section 2 of the sample form presentation output presents proposed solutions to the need. This usually involves identifying and presenting alternative plan(s) or financial product (s) to meet the need, and factors such as the provider, coverage and price particular to each plan and product. Referring again to Appendix 1, most of section 2 comprises product logic and pricing logic. The boxed portion in which the client may select the desired plan also includes product logic, for example, in that not all product proposals will include the same plans as has been demonstrated in the examples shown above. Much of the information presented in the footnote supplementing the product presentation involves word logic, but customer logic (e.g., personal information about the client), product logic, and pricing logic also appear in this footnote material. The footnotes both front and back are highly individualized throughout.

In the case of individual life insurance, the proposed plans may include various plans which include term insurance products, and permanent insurance plans such as whole life, universal life, and the like.

Section 3 of the sample presentation format of Appendix 1 explains the various products selected by the Virtual Agent™ module for presentation to the client in this presentation. This section may include word logic and product logic, for example, in that is may provide alternative descriptions, explanations, even different tone of writing depending on such things as the age of the client.

Section 4 of the sample presentation format of Appendix 1 explains each plan utilized and selected by the Virtual Agent™ module. This section typically would include word logic and product logic in that the description would change for the various products and classes of the various plans and products. The description of plans will vary with the plans selected. In addition, for a given plan the explanation may change to more particularly addressed a given client or class of clients. For example, the explanation provided to a client in the twenty (20) to forty (40) year old category may differ from the explanation from for the same product provided to a client in the sixty-five (65) to sixty-nine (69) year old range. Similarly, the explanation for a single male may differ for a given product from the explanation provided for the same products to a married couple.

Incidentally, the location of the various sections as described herein would not necessarily appear sequentially, e.g., section 1, 2, 3, . . . . The order may be changed or mixed, and information from one section may be intermingled or interposed with information from another section or sections. Sections and what is contained therein also may be subject to change frequently.

Section 5 of the sample presentation format explains to the client if there are requirements to qualify for a particular plan presented, if any. These requirements will be listed in this section 5 (if the plan requires such based on among other things, amount of insurance, age, etc.) if it is necessary to qualify with more than just the standard application presented to the client. Much of the logic here centers around Plan/Product/Amount of Coverage/Underwriting Logic, etc., and word and client information logic.

Section 6 of the sample presentation format explains in clear, concise and individualized terms how to obtain the coverage. This section typically will include customer logic in personalizing the presentation, e.g., by inserting the client's name in various places in the text, and product logic in explaining the requirements specific to a particular product(s).

Section 7 of the sample presentation format presents, in question and answer format, for example, important information and commonly asked questions regarding the plans and products shown in the presentation. This section typically would include word logic, e.g., to refer to the system user or product marketer. It also may include customer information logic, e.g., to refer to specific circumstances which the customer may encounter.

Section 8 of the sample presentation format is variable in nature, and may be customized for a given application, product set, system user, etc. It may, for example, provide information on how to obtain additional information, help with application forms, additional price quotes, etc. Given its customized format it may include any of the logic forms as variables.

Through designation by the system user in interaction with the system, the output module creates the format to be used, the specific information to be included within the format, and the specific locations in the output format where the specific items of information will be used. It also formats all sections to be easy to read and highly organized, no matter what amount of information is contained in the output.

In accordance with the preferred method, all sales presentation output sent to the client is accompanied by an application for the financial product, together with an envelope or other means to facilitate return. For example, presentation letters would be accompanied by a application for the products presented therein with a return envelope. This also could include electronic communication forms, such as by return e-mail, etc. This effectively results in a one-step sales process for any or all sales programs and products marketed by the system.

The Administrative and Support System

Turning now to the administrative and support system as illustrated in FIG. 2, the various modules of this system are intended to provide support functions for the Core System modules. In addition, they include management and administrative support modules to aid management in the system, including operation of the core system, scheduling of follow-ups, future communications, etc., with little or no need for human involvement.

The Production and Scheduling Module

The production and scheduling module automates scheduling of marketing sales, preparing budgets, and the like. A flow diagram outlining the logical organization and flow of the production and scheduling module as shown in FIG. 11.

Figure 11:
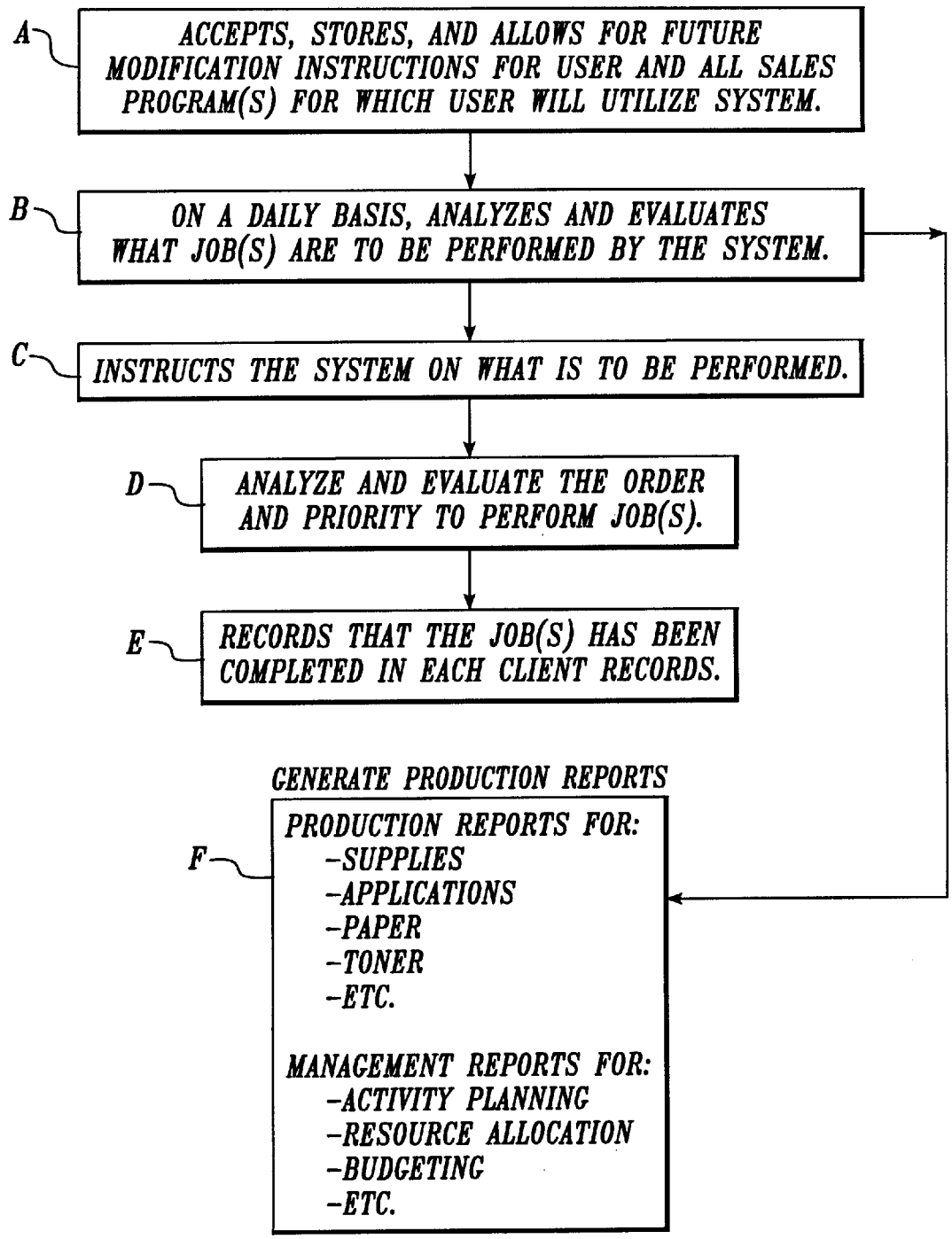
FIG. 11 is a flow chart diagram illustrating the organization and flow of the production and scheduling module of the preferred embodiment and method as depicted in FIG. 2.

In Step A of FIG. 11, the production and scheduling module accepts, stores and allows for future modification instructions for system user(s), and for all sales programs for which the system user will utilize the system. Future add-on sales programs can be easily accepted.

As shown in Step B of FIG. 11, the production and scheduling module analyzes and evaluates the jobs which are to be performed by the system. This is done on a daily basis. With this information as an input, the production and scheduling module schedules operation of the core system and instructs the system to operate accordingly, as indicated in Step C. In the course of this scheduling and the instruction, the production and scheduling module operates according to a set of predetermined criteria to determine the ordering and scheduling of the system operation and job performance.

As jobs are completed, the scheduling module causes that fact to be recorded in each of the client records for which processing has been successfully completed. This is indicated in Step E of FIG. 11.

As an administrative support role, the production and scheduling module is capable of generating hard copy, readable, production reports, e.g., on a daily basis, as indicated in Step F. of FIG. 11. Production reports may be useful for system users and operators, for example, for allocating and providing sufficient supplies, paper, toner, etc. The system also is capable of generating management reports which can aid management in activity planning, resource allocation, budgeting, etc.

The production and scheduling module also is useful for automatically following up on pre-defined activities. A key attribute of the production and scheduling module is it's ability to remember a virtually unlimited number of users and user sales program(s) and implement a virtually unlimited number of instructions for the system to begin work at any point in the future.

The Sales and Financial Report And Analysis Module

The sales & financial report and analysis module ("sides module") assembles, calculates and outputs sales, test, financial and projected earnings reports. This can be done on a real-time basis with the preferred embodiment and method.

Figure 12:
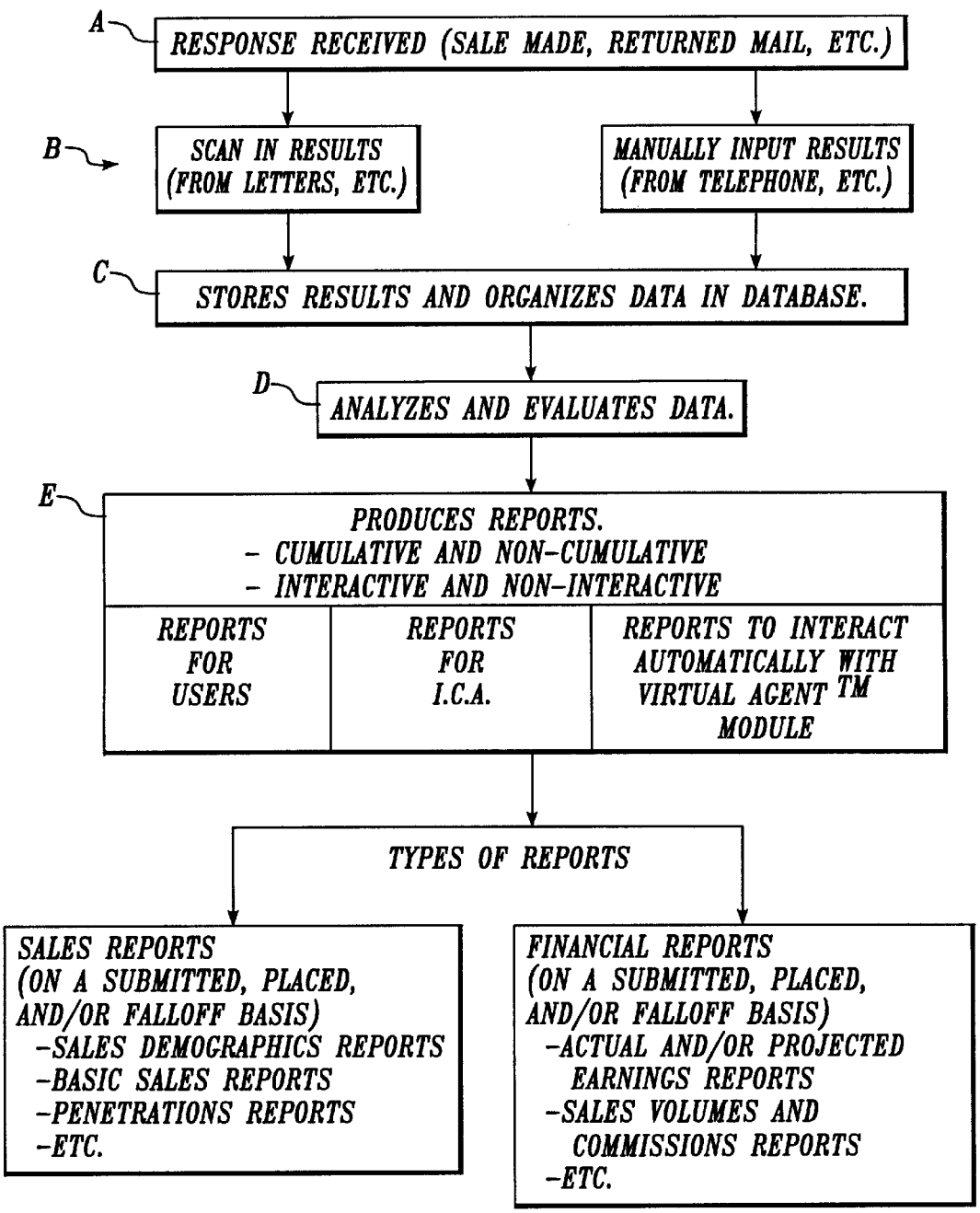
FIG. 12 is a flow chart diagram illustrating the organization and flow of the sales and financial report and analysis module of the preferred embodiment and method as depicted in FIG. 2.

A flow chart which illustrates the organization and flow of the sales and financial report and analysis module is shown in FIG. 12. As shown in that illustrative diagram, Step A involves receiving sales information based on sales of financial products actually made. In Step B, these sales results are inputted into the system, manually, by scanning, or by other methods described above which regard to the data input module. In Step C of FIG. 12, these results are stored and organized in a sales database resident in the database module.

The sales report module analyzes and evaluates this sales data, e.g., by segregating and compiling it in formats and statistical summaries useful in management. Once calculated, compiled, etc., the data may be incorporated into and reported as sales reports, as reflected in Step E of FIG. 12. These reports may be cumulative in nature or they may be non-cumulative, essentially reflecting snapshots in time. The reports also may be interactive or non-interactive, depending on the format selected, the output mode, etc. The reports may be provided to system users, management, etc. These reports also may be used in digital or automated form to interact automatically with other modules of the system, for example, the Virtual Agent™ module.

The sales reports may compile such information as sales demographics, penetration, etc. They may reflect such statistics on several basics, such as sales submitted, the number of sales actually placed, as policies and the number of sales which resulted in falloff (for which no policy was issued or taken).

The sales module also is adapted to generate financial reports. These financial reports also may reflect sales on a submitted, placed, and or falloff basis. They may be incorporated with other data to reflect actual and/or projected earnings reports, commission reports, and the like.

The Telemarketing Module

Figure 13:
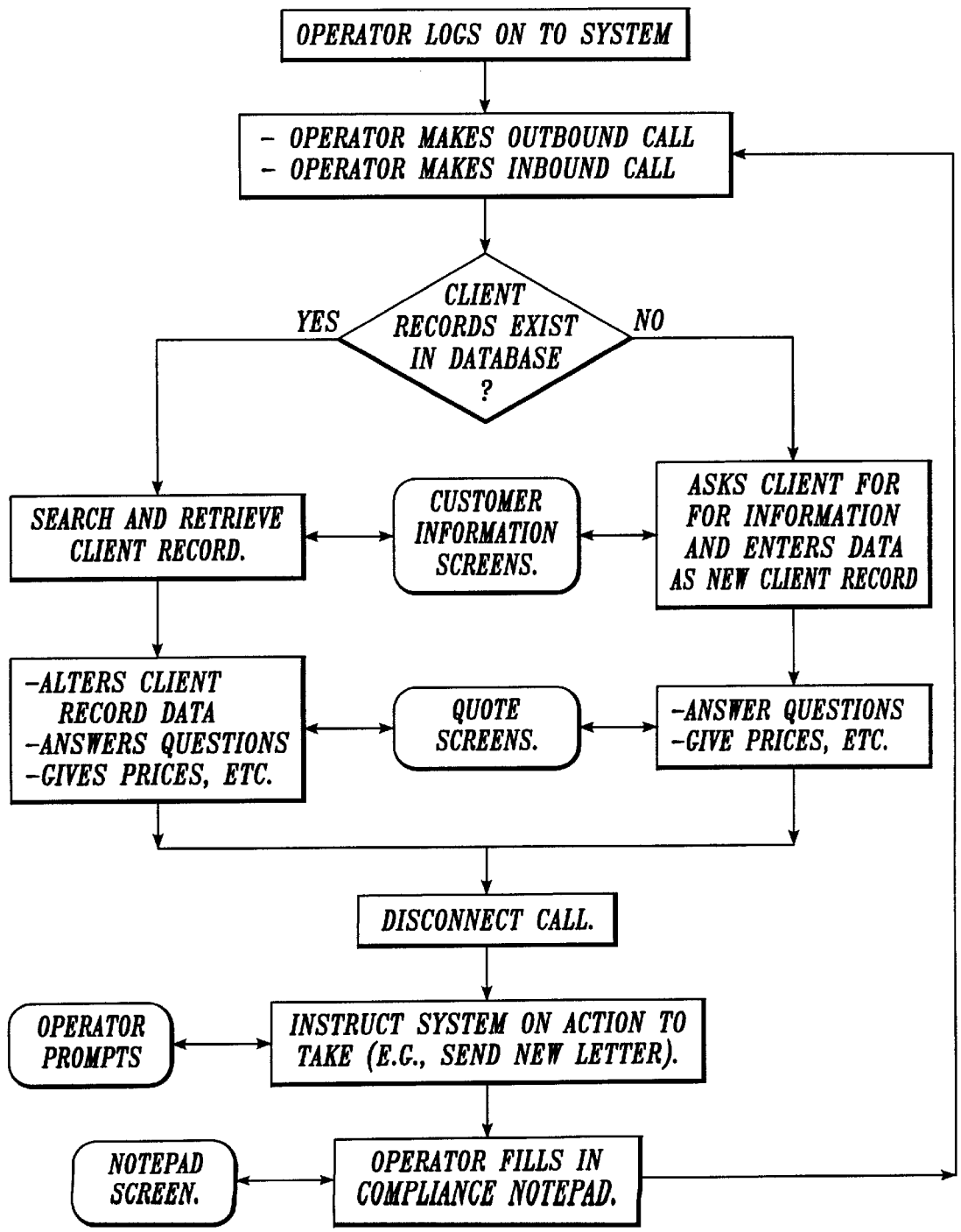
FIG. 13 is a flow chart diagram illustrating the organization and flow of the telemarketing module of the preferred embodiment and method as depicted in FIG. 2.

The system also supports a telemarketing function using the telemarketing module. An illustrative flow chart which outlines the organization and flow of the telemarketing module is shown in FIG. 13. In accordance with that flow chart, the operator would log on to the system and thereby gain access to it. Communications between the operator and clients would take place, for example, through inbound or outbound calls. For existing clients for whom a client record exists in the client database, that record would be retrieved and edited appropriately. Where no client record exists, a new one would be created as reflected in FIG. 13. In both instances, information would be entered into the system so that the client record reflects the appropriate client information. When this task is complete, the call is disconnected. At this stage, the operator may instruct the system, e.g., to schedule an input the client record for processing in the core system to generate a presentation letter. To create a record of the communication the operator would complete the compliance note pad to reflect the conversation and the events which occurred during it.

The Automated Agency And New Business Module

This "new business" module supports the processing for new business. The automated agency portion of this module supports the future policy holder service and insurance needs of the client automatically. A flow chart reflecting the organization and logic of this module is shown in FIG. 14.

Figure 14:
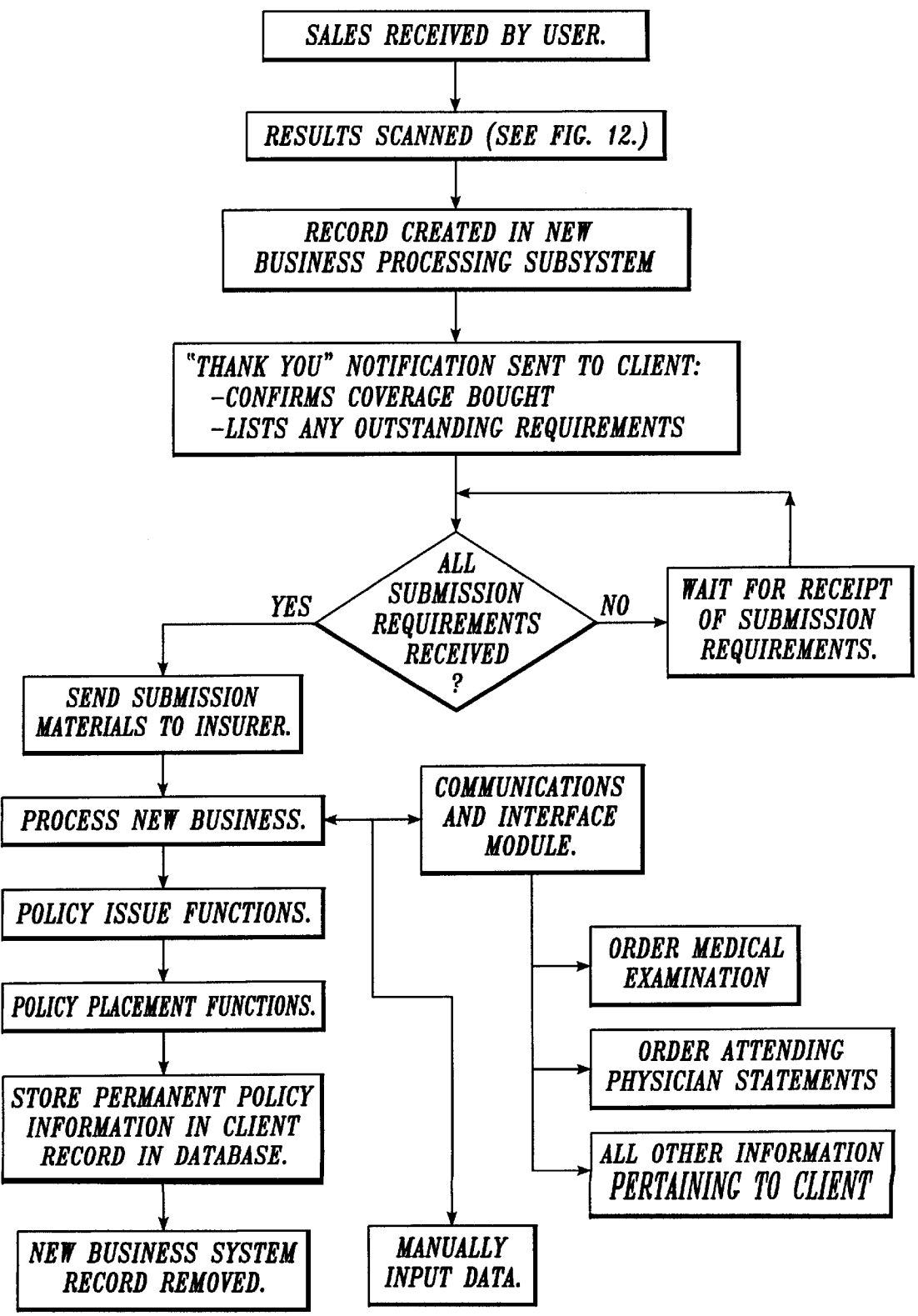
FIG. 14 is a flow chart diagram illustrating the organization and flow of the automated agency and new business processing module of the preferred embodiment and method as depicted in FIG. 2.

Referring to FIG. 14, as sales are made the sales information is received by the system user. The sale results are inputted, for example, by scanning, or by other input means, e.g., as disclosed in the discussion of the data input module. As new sales are made a corresponding client record is created in this module. The module automatically creates a "thank you" notification, which is particularized for that particular client. It confirms the products that have been purchased and the corresponding coverage. The automatically-generated communications also lists any outstanding requirements the client needs to execute to obtain product.

In addition to generating a confirming notice to the client, the system also manages the tasks, if any which correspond with sales and new business. As reflected in FIG. 14, such followup tasks may include sending submission materials to the product provider, processing the new business, e.g., from an accounting perspective, attending to function relating to issuance of the policy, placement functions, etc. Client records and other system files are updated as appropriate to reflect the sales, the correspondence of the client, etc.

In performing these tasks, it may be necessary in some instances to undertake additional communications, which may implicate the communications and interface module. These communications may be required, for example, to order medical examinations, to order attending physician statements, and to obtain all other information pertaining to the client as required under the circumstances. This module will follow-up on these requirements automatically with no human intervention.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An apparatus for using client information about clients in the form of a plurality of client records to automatically select and present financial products appropriate for each of the clients, the apparatus comprising:

means for inputting the client information, information about the financial products, and decision criteria pertaining to selection from among the financial products, the inputting means automatically inputting the plurality of client records without human intervention between input of the respective client records;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client; and means for preparing a client communication for each of the clients which identifies the subset of the financial products for that client.

2. A method for using client information about clients comprising a plurality of client records to automatically select and present financial products appropriate for the clients, the method comprising:

automatically inputting into a computer-accessible storage medium the client information including the plurality of client records without human intervention between input of the respective client records, inputting information about the financial products, and inputting decision criteria pertaining to selection from among the financial products;

using a central processing unit in communication with the storage medium to select a subset of the financial products for each of the clients appropriate for that client using the client information, the financial products information, and the decision criteria; and using an output device to prepare a client communication for each of the clients which identifies the subset of the financial products appropriate for that client.

3. An apparatus as recited in claim 1, wherein the inputting means comprises a disk drive.

4. An apparatus as recited in claim 1, wherein the inputting means comprises a tape drive.

5. An apparatus as recited in claim 1, wherein the inputting means comprises an optical scanner.

6. An apparatus as recited in claim 1, wherein the inputting means comprises a bar code reader.

7. An apparatus as recited in claim 1, wherein the inputting means comprises a modem.

8. An apparatus for using client information about clients to automatically select and present financial products appropriate for each of the clients, the apparatus comprising:

means for inputting the client information, information about the financial products, and decision criteria pertaining to selection from among the financial products, the client information comprising information other than a client name, address, age, marital status, tobacco habits, and amount of life insurance coverage for a given client;

means operatively coupled to the inputting means for storing the client information, the financial products information, and the decision criteria;

means operatively coupled to the storing means for using (a) the client information including the information other than a client name, address, age, marital status, tobacco habits, and amount of life insurance coverage for a given client, (b) the financial products information, and (c) the decision criteria to select a subset of the financial products for each of the clients appropriate for that client; and means for preparing a client communication for each of the clients which identifies the subset of the financial products for that client.

9. An apparatus as recited in claim 8, wherein:

the financial products comprise life insurance products and the inputting means comprise means for inputting the financial products information to include information regarding individual life insurance products other than term life insurance products.

10. An apparatus as recited in claim 8, wherein:

the inputting means includes means for inputting the financial product information as term life insurance product information and permanent life insurance product information; and the selecting means includes means for selecting the term life insurance product information and the permanent life insurance product information as part of the subset of financial products.

11. An apparatus as recited in claim 8, wherein:

the inputting means inputs the financial product information as product price data and non-price product information; and the selecting means selects the subset of financial products based upon the non-price product information.

12. An apparatus as recited in claim 8, wherein:

the inputting means includes means for inputting the client information to include a financial income; and the selecting means includes means for selecting the subset of financial products based upon the financial income.

13. An apparatus as recited in claim 8, wherein:

the inputting means includes means for inputting the client information to include a mortgage amount; and the selecting means includes means for selecting the subset of financial products based upon the mortgage amount.

14. An apparatus for using client information about clients to automatically select and present financial products appropriate for each of the clients, the apparatus comprising:

means for inputting the client information, information about the financial products including financial products having the differing face value amounts, and decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client, the selecting means including means for selecting the subset of financial products to include the financial products having the differing face value amounts; and means for preparing a client communication for each of the clients which identifies the subset of the financial products for that client.

15. An apparatus for using client information about clients to automatically select and present financial products appropriate for each of the clients, the apparatus comprising:

means for inputting the client information, information about the financial products, and decision criteria pertaining to selection from among the financial products, the financial product information including a plurality of plans wherein at least one of the plans includes a plurality of the financial products;

means operatively coupled to the inputting means for storing the client information, the financial products information, and the decision criteria;

means operatively coupled to the storing means for using the client information, the financial products information, and the decision criteria to select a subset of the financial products in the form of a plurality of the plans for each of the clients appropriate for that client; and means for preparing a client communication for each of the clients which identifies the subset of the financial products for that client.

16. An apparatus for using client information about clients to automatically select and present financial products appropriate for each of the clients, the apparatus comprising:

means for inputting the client information, information about the financial products, ancillary data, and decision criteria pertaining to selection from among the financial products;

means operatively coupled to the inputting means for storing the client information, the financial products information, the ancillary data and the decision criteria;

means operatively coupled to the storing means for using the client information, the financial products information, the ancillary data and the decision criteria to select a subset of the financial products for each of the clients appropriate for that client; and means for preparing a client communication for each of the clients which identifies the subset of the financial products for that client.

17. An apparatus as recited in claim 16, wherein:

the inputting means comprises means for inputting the ancillary data to include statistical data; and the selecting means includes means for using the statistical data to select the subset of financial products.

18. An apparatus as recited in claim 16, wherein:

the inputting means comprises means for inputting the ancillary data to include geo-code data; and the selecting means includes means for using the geo-code data to select the subset of financial products for that client.

19. An apparatus for using client information about clients to automatically select and present financial products appropriate for each of the clients, the apparatus comprising:

means for inputting (a) the client information, (b) information about the financial products including at least one term life insurance product and at least one insurance product other than a term life insurance product, and (c) decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client, the subset of the financial products including the at least one term life insurance product and the at least one insurance product other than a term life insurance product; and means for preparing a client communication for each of the clients which identifies the subset of the financial products for that client.

20. An apparatus for using client information about clients to automatically select and present financial products appropriate for each of the clients, the apparatus comprising:

means for inputting (a) the client information, (b) information about the financial products wherein the financial products have differing face values, and (c) decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client, wherein the subset of financial products includes the financial products having differing face values; and means for preparing a client communication for each of the clients which identifies the subset of the financial products for that client.

21. An apparatus for using client information about clients to automatically select and present financial products appropriate for each of the clients, the apparatus comprising:

means for inputting (a) the client information, (b) information about the financial products including product price data and non-price product information, and (c) decision criteria pertaining to selection from among the financial products;

means operatively coupled to the input means for storing the client information, the financial products information, and the decision criteria;

means operatively coupled to the storing means for using the client information, the financial products information including the non-price product information, and the decision criteria to select a subset of the financial products for each of the clients appropriate for that client; and means for preparing a client communication for each of the clients which identifies the subset of the financial products for that client.

22. An apparatus for using client information about clients to automatically select and present financial products appropriate for each of the clients, the apparatus comprising:

means for inputting the client information, information about the financial products, a plurality of plans each of which includes at least one of the financial products, and decision criteria pertaining to selection from among the plans;

means operatively coupled to the inputting means for storing the client information, the financial products information, the plans, and the decision criteria;

means operatively coupled to the storing means for using the client information, the financial products information, the plans and the decision criteria to select a subset of the plans for each of the clients appropriate for that client, the subset of the plans including at least one plan comprising a plurality of the financial products; and means for preparing a client communication for each of the clients which identifies the subset of the plans for that client.

23. An apparatus for using client information about clients to automatically select and present financial products appropriate for each of the clients, the apparatus comprising:

means for inputting the client information, information about the financial products, and decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client; and means for preparing a client communication for each of the clients which identifies the subset of the financial products for that client, the client communication preparing means incorporating a portion of the client information other than a client name, address, age, marital status, tobacco habits, and amount of life insurance coverage for a given client.

24. An apparatus as recited in claim 23, further including means operatively coupled to the client communication preparing means for outputting the client communications to a remote location.

25. An apparatus for using client information about clients to automatically select and present financial products appropriate for each of the clients, the apparatus comprising:

means for inputting the client information, information about the financial products, and decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients appropriate for that client; and means for preparing a client communication for each of the clients which identifies the subset of the financial products for that client, the client communication means further using words/paragraphs/sentence logic to incorporate at least one of variable words, variable paragraphs, and variable sentences into each of the client communications.

26. An apparatus as recited in claim 25, wherein the client communication preparing means comprises means for preparing each of the client communications to include:

a first section including header information comprising the client information for that client, and a second section including product presentation information comprising the financial product information for the subset of the financial products for that client and a portion of the client information for that client.

27. An apparatus as recited in claim 25, further including means operatively coupled to the client communication preparing means for outputting the client communications to a remote location.

28. An apparatus for using client information about clients to automatically select and present financial products appropriate for each of the clients, the apparatus comprising:

means for inputting the client information, information about the financial products, and decision criteria pertaining to selection from among the financial products;

means operatively coupled to the inputting means for storing the client information, the financial products information, and the decision criteria;

means operatively coupled to the storing means for using the client information, the financial products information, and the decision criteria to select a subset of the financial products for each of the clients; and means for preparing a client communication for each of the clients which identifies the subset of the financial products for that client, the client communication preparing means incorporating into each of the client communications a portion of the client information for that client and a portion of the financial products information for the subset of products selected for that client, the client communication preparing means further using at least one of (a) customer information logic, (b) words/paragraphs/sentence logic, (c) product/plan/amount of coverage/payment mode/underwriting logic, and (d) pricing logic to incorporate at least one of the client information and the financial product information into a footnote within each of the client communications.

29. An apparatus as recited in claim 28, further including means operatively coupled to the client communication preparing means for outputting the client communications to a remote location.

30. A method as recited in claim 2, wherein the inputting step comprises inputting the client records using a disk drive.

31. A method as recited in claim 2, wherein the inputting step comprises inputting the client records using a tape drive.

32. A method as recited in claim 2, wherein the inputting step comprises inputting the client records using an optical scanner.

33. A method as recited in claim 2, wherein the inputting step comprises inputting the client records using a bar code reader.

34. A method as recited in claim 2, wherein the inputting step comprises inputting the client records using a modem.

35. A method for using client information about clients to automatically select and present financial products appropriate for each of the clients, the method comprising the steps of:

inputting into a computer-accessible storage medium the client information, information about the financial products, and decision criteria pertaining to selection from among the financial products, the client information comprising information other than a client name, address, age, marital status, tobacco habits, and amount of life insurance coverage for a given client;

using a central processing unit in communication with the storage medium to select for each of the clients a subset of the financial products appropriate for that client using (a) the client information including the information other than a client name, address, age, marital status, tobacco habits, and amount of life insurance coverage for a given client, (b) the financial products information, and (c) the decision criteria; and using an output device to prepare a client communication for each of the clients which identifies the subset of the financial products for that client.

36. A method as recited in claim 35, wherein the financial products comprise life insurance products and the inputting step includes inputting information regarding individual life insurance products other than term life insurance products.

37. A method as recited in claim 35, wherein:

the inputting step includes inputting term life insurance product information and permanent life insurance product information as part of the financial product information; and the selecting step includes selecting as part of the subset of financial products for the clients the term life insurance product information and the permanent life insurance product information.

38. A method as recited in claim 35, wherein:

the inputting step includes inputting product price data and non-price product information as part of the financial product information; and the selecting step includes selecting the subset of financial products based upon the non-price product information.

39. A method as recited in claim 35, wherein:

the inputting step includes inputting a financial income for each of the clients as part of the client information; and the selecting step includes selecting the subset of financial products for each of the clients based upon the financial income for that client.

40. A method as recited in claim 35, wherein:

the inputting step includes inputting a mortgage amount as part of the client information; and the selecting step includes selecting the subset of financial products based upon the mortgage amount.

41. A method for using client information about clients to automatically select and present financial products appropriate for each of the clients, the method comprising:

inputting into a computer-accessible storage medium the client information, information about the financial products including financial products having differing face value amounts, and decision criteria pertaining to selection from among the financial products;

using a central processing unit in communication with the storage medium to select a subset of the financial products using the client information, the financial products information, and the decision criteria to select a subset of the financial products for each of the clients appropriate for that client, the selecting step including selecting the subset of financial products to include the financial products having the differing face value amounts; and using an output device to prepare a client communication for each of the clients which identifies the subset of the financial products for that client.

42. A method for using client information about clients to automatically select and present financial products appropriate for each of the clients, the method comprising:

inputting into a computer-accessible storage medium the client information, information about the financial products, and decision criteria pertaining to selection from among the financial products, the financial product information including a plurality of plans wherein at least one of the plans includes a plurality of the financial products;

using a central processing unit in communication with the storage medium to select a subset of the financial products in the form of a plurality of the plans for each of the clients appropriate for that client using the client information, the financial products information, and the decision criteria; and using an output device to prepare a client communication for each of the clients which identifies the subset of the financial products for that client.

43. A method for using client information about clients to automatically select and present financial products appropriate for each of the clients, the method comprising:

inputting into a computer-accessible storage medium the client information, information about the financial products, ancillary data, and decision criteria pertaining to selection from among the financial products;

using a central processing unit in communication with the storage medium to select for each of the clients a subset of the financial products appropriate for that client using the client information, the financial products information, the ancillary data and the decision criteria; and using an output device to prepare a client communication for each of the clients which identifies the subset of the financial products for that client.

44. A method as recited in claim 43, wherein:

the inputting step includes inputting statistical data as part of the ancillary data; and the selecting step includes using the statistical data to select the subsets of financial products for the clients.

45. A method as recited in claim 43, wherein:

the inputting step includes inputting geo-code data as part of the ancillary data; and the selecting step includes using the geo-code data to select the subsets of financial products for the clients.

46. A method for using client information about clients to automatically select and present financial products appropriate for each of the clients, the method comprising:

inputting into a machine-readable storage medium (a) the client information, (b) information about the financial products including at least one term life insurance product and at least one insurance product other than a term life insurance product, and (c) decision criteria pertaining to selection from among the financial products;

using a central processing unit in communication with the storage medium to select for each of the clients a subset of the financial products appropriate for that client using the client information, the financial products information, and the decision criteria, the subset of the financial products including the at least one term life insurance product and the at least one insurance product other than a term life insurance product; and using an output device to prepare a client communication for each of the clients which identifies the subset of the financial products for that client.

47. A method for using client information about clients to automatically select and present financial products appropriate for each of the clients, the method comprising:

inputting into a machine-readable storage medium (a) the client information, (b) information about the financial products wherein the financial products have differing face values, and (c) decision criteria pertaining to selection from among the financial products;

using a central processing unit in communication with the storage medium to select a subset of the financial products for each of the clients appropriate for that client using the client information, the financial products information, and the decision criteria, wherein the subset of financial products includes the financial products having differing face values; and using an output device to prepare a client communication for each of the clients which identifies the subset of the financial products for that client.

48. A method for using client information about clients to automatically select and present financial products appropriate for each of the clients, the method comprising:

inputting into a machine-readable storage medium (a) the client information, (b) information about the financial products including product price data and non-price product information, and (c) decision criteria pertaining to selection from among the financial products;

using a central processing unit in communication with the storage medium to select a subset of the financial products for each of the clients appropriate for that client using the client information, the financial products information including the non-price product information, and the decision criteria; and using an output device to prepare a client communication for each of the clients which identifies the subset of the financial products for that client.

49. A method for using client information about clients to automatically select and present financial products appropriate for each of the clients, the method comprising:

inputting into a machine-readable storage medium the client information, information about the financial products, a plurality of plans each of which includes at least one of the financial products, and decision criteria pertaining to selection from among the plans;

using a central processing unit in communication with the storage medium to select a subset of the plans for each of the clients appropriate for that client using the client information, the financial products information, the plans and the decision criteria, the subset of the plans including at least one plan comprising a plurality of the financial products; and using an output device to prepare a client communication for each of the clients which identifies the subset of the plans for that client.

50. A method for using client information about clients to automatically select and present financial products appropriate for each of the clients, the method comprising:

inputting into a machine-readable storage medium the client information, information about the financial products, and decision criteria pertaining to selection from among the financial products;

using a central processing unit in communication with the storage medium to select a subset of the plans for each of the clients appropriate for that client using the client information, the financial products information, and the decision criteria; and using an output device to prepare a client communication for each of the clients which identifies the subset of the financial products for that client, the client communication incorporating a portion of the client information other than a client name, address, age, marital status, tobacco habits, and amount of life insurance coverage for a given client.

51. A method as recited in claim 50, wherein the output step includes outputting the client communications to a remote location.

52. A method for using client information about clients to automatically select and present financial products appropriate for each of the clients, the method comprising:

inputting into a machine-readable storage medium the client information, information about the financial products, and decision criteria pertaining to selection from among the financial products;

using a central processing unit in communication with the storage medium to select a subset of the plans for each of the clients appropriate for that client using the client information, the financial products information, and the decision criteria; and using an output device to prepare a client communication for each of the clients which identifies the subset of the financial products for that client, the client communication preparing step further including using words/ paragraphs/ sentence logic to incorporate at least one of variable words, variable paragraphs, and variable sentences into each of the client communications.

53. A method as recited in claim 52, wherein the client communication preparing step comprises preparing each of the client communications to include:

a first section including header information comprising the client information for that client, and a second section including product presentation information comprising the financial product information for the subset of the financial products for that client and a portion of the client information for that client.

54. A method as recited in claim 52, wherein the outputting step further includes outputting the client communications to a remote location.

55. A method for using client information about clients to automatically select and present financial products appropriate for each of the clients, the method comprising:

inputting into a machine-readable storage medium the client information, information about the financial products including plans pertaining to the financial products, and decision criteria pertaining to selection from among the financial products;

using a central processing unit in communication with the storage medium to select a subset of the plans for each of the clients appropriate for that client using the client information, the financial products information, and the decision criteria; and using an output device to prepare a client communication for each of the clients which identifies the subset of the financial products for that client, wherein each of the client communications includes a portion of the client information for that client and a portion of the financial products information for the subset of products selected for that client, the client communication preparing step including using at least one of (a) customer information logic, (b) words/paragraphs/sentence logic, (c) product/ plan/amount of coverage/payment mode/underwriting logic, and (d) pricing logic to incorporate at least one of the client information and the financial product information into a footnote within each of the client communications.

56. A method as recited in claim 55, wherein the outputting step further includes outputting the client communications to a remote location.

* * * * *

UNITED STATES PATENT AND TRADEMARK OFFICE
CERTIFICATE OF CORRECTION

PATENT NO. : 5,987,434 Page 1 of 1
DATED : November 16, 1999
INVENTOR(S) : Richard Marc Libman It is certified that error appears in the above-identified patent and that said Letters Patent is hereby corrected as shown below:

Title page,
Item [56], References Cited, U.S. PATENT DOCUMENTS, replace "5,643,402" with -- 5,673,402 --.
OTHER PUBLICATIONS,
""Agenda for Windows"" reference, replace "Agenda" with -- AGENA --.
"Saommers/Moreland & Associates," reference, replace "Saommers" with -- Sommers --.
"Equigard Insurance Services," reference, replace "Equigard" with -- Equiguard --.
"CONA Life Insurance Solicitation." reference, replace "CONA" with -- CUNA --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 5,987,434 Page 1 of 7
APPLICATION NO. : 08/661004
DATED : November 16, 1999
INVENTOR(S) : Richard Marc Libman It is certified that error appears in the above-identified patent and that said Letters Patent is hereby corrected as shown below:

Column 20
After line 35, please insert the attached 6 pages of Appendices.

Signed and Sealed this

Third Day of August, 2010

David J. Kappos
*Director of the United States Patent and Trademark Office*

APPENDIX 1A

Sec. 1

Mr. John Smith
234 Main Street
Anytown, CA 99999

Mortgagor: John Smith
Co-Mortgagor: Mary Smith
Loan #: 51884
Loan Amount: $100,000

Dear Mr. Smith,

Congratulations! We have been informed that your mortgage loan has been approved. Now we have more good news for you.

As you can see below, you can choose one of three different mortgage protection plans utilizing life insurance, each one specifically designed for your loan. We give you the choice of selecting the particular type of coverage that best suits your individual needs.

At USA Savings & Loan Insurance Services, we take particular pride in providing our customers with superior products and services. Our mortgage protection plans, which we make available to you, are clear examples of this commitment.

Sec. 2 Please review your three choices below. Based on your $100,000 mortgage loan, we feel certain that one is sure to meet your own specific needs and preferences.

| PLAN A* | PLAN B* | PLAN C* |
|---|---|---|
| Critical Period Protection | Full Protection | Joint Protection |
| Select One: | Monthly Cost: $26.16 | Monthly Cost: $39.81 |
| ☐ 3 years of mortgage payments Monthly Cost: $1.89 | | |
| ☐ 4 years of mortgage payments Monthly Cost: $4.38 | Death Benefit: $100,000 | Death Benefit: $100,000 |
| Upon the death of John Smith, provides the family with money equal to 3 years or 4 years of mortgage payments | Provides money for the immediate payoff of your mortgage upon the death of John Smith | Provides money for the immediate payoff of your mortgage upon the death of either John Smith or Mary Smith |

Please indicate your choice here; then, see instructions on reverse side.

Yes, I choose Plan... ☐ A (3 yrs.) ☐ A (4 yrs.) ☐ B ☐ C

I wish to be billed: ☐ Anually ☐ Monthly (Automatic Checking Account Deduction)

*See other side for a full description of this plan. All premiums above reflect standard, non-tobacco rates. If you use tobacco, your monthly cost will be $2.31 for Plan A (3 yr.) and $5.37 for Plan A (4 yr.), and $31.24 for Plan B. For Plan C, if both parties use tobacco, the monthly cost will be $47.75. If John uses tobacco and Mary does not the cost will be $50. If Mary uses tobacco and John does not the cost will be $41.16. Above prices are based on age(s) as of date of loan approval. John is male age 40 and Mary is female age 37.

© I.C.A. Insurance Marketing 1996 All Rights Reserved.

APPENDIX 1B

|  | Number of Different Possibilities |
|---|---|
| Customer Information Logic | 22 |
| Word/Paragraph/Sentence Logic | 4 |
| Product/Plan/Amount of Coverage/Payment Mode/Underwriting Logic | 24 |
| Pricing Logic | 26 |
| Total | 76 |

FRONT OF LETTER

APPENDIX 1C

SEC. 3

IMPORTANT INFORMATION ABOUT THIS OFFER

Please do not mistake this offer for a Group Mortgage Life Insurance offer that you may have received from time to time in the mail. The insurance being offered here is individual coverage for our new loan customers. Our individual policies have these advantages over most group mortgage life policies:

O Lower Cost
  - ✓ Because you must qualify for this coverage individually, the cost of insurance is lower than if no qualification were needed. If you are in good health, why pay more?
  - ✓ Because of the probability these days that most people will not stay in the same home for a full 30 year mortgage, our policies have shorter durations than 30 years. They are therefore less expensive.
  - ✓ Because these policies can be kept active from loan to loan, no matter how often you change your loan, you do not have to re-buy a new mortgage life policy, at a costlier older age, every time a change is made.

O Level Death Benefits
  The death benefit of these policies <u>do not reduce</u> as the mortgage loan decreases. Your beneficiary will have extra money available since, after a few years, the level death benefit will be larger than the outstanding loan¹.

The beneficiary may choose to use the money for any purpose, depending upon circumstances at time of claim. Or, if you desire, the death benefit may be used for <u>mortgage purposes only</u>, if initially requested.

SEC. 4

EXPLANATION OF EACH PLAN

Critical Period Protection - Plan A
Provides coverage in an amount sufficient for your family to pay the monthly mortgage payments for your choice of 3 years or 4 years². This period is generally considered to be the most critical period for the family after the death of an income earner. The importance of Critical Period Protection centers on the ability of the family to remain in their home until a decision can be made as to future plans. This choice is a lower cost alternative to purchasing full loan balance insurance as in Plans B or C.

Full Protection - Plan B
Provides insurance for the full mortgage loan amount on the life of [John Smith]. [$100,000] will be paid in full at the time of his death. If only one person's income is primarily responsible for loan payments, this may be the best choice for you.

Joint Protection - Plan C
Provides insurance for the full mortgage loan amount on each co-borrower. The [$100,000] benefit will be paid in full no matter which insured dies first. The surviving co-borrower may keep his or her [$100,000] benefit active. Joint Protection is especially important in these times when it often takes the combined income of two persons to meet mortgage payments. If both the borrower and the co-borrower earn income, this is, perhaps, the most sensible choice for you.

SEC. 4

¹This applies except for Plan A.  ²Based upon the loan interest rate and monthly mortgage payment at the time of loan.
*All policies are underwritten by XYZ Life Insurance Company, Anytown, California. Plan A utilizes Form CT20 (a 20 year level premium and level death benefit renewable term insurance policy). Plan B utilizes Form CT20 (a 20 year level premium and level death benefit renewable term insurance policy). Plan C utilizes Form CT20 (a 20 year level premium and level death benefit renewable term insurance policy). The death benefit under Plan A (3 yrs.) is [$30,000] and under Plan A (4 yrs.) is [$40,000].

NAA11003                                                                                     30020

SEC. 6

HOW TO OBTAIN THIS COVERAGE

① CHOOSE: Select Plan A (3 or 4 year), B, or C by checking the box on the bottom of page 1.

② FILL OUT:
  For Plan A or B: [John Smith] fills out one of the enclosed applications answering all the questions (you may discard the second application).
  For Plan C: [John and Mary Smith] each fill out one of the enclosed applications answering all the questions.
  For Question 6A: Please indicate either Plan A (3 or 4 year), B, or C. Please disregard Question 6D.

③ SIGN:
  For Plan A or B: [John Smith] signs next to the two (2) red x's at the bottom of the application.
  For Plan C: [John Smith] signs next to the two red (2) x's at the bottom of his application and [Mary Smith] signs next to the two red (2) x's at the bottom of her application.

④ RETURN: Return this letter and application(s) to us in the postage-paid envelope provided.

Please Note: If you select Plan B or C: To help you qualify for the lowest cost possible, we are arranging a short paramedical examination at no cost to you. This can be done at your home or office. The exam is a simple one and will only take 10 to 15 minutes.

SEC. 5

SEC. 7

QUESTIONS & ANSWERS

Q: Who is USA Savings & Loan Insurance Services?
A: We are an insurance agency wholly owned by USA Savings & Loan. We were created so our customers would have the peace of mind knowing that the related mortgage insurance products they buy were carefully selected, scrutinized for price and quality, and will be serviced by us.

Q: Why should I buy this product?
A: Mortgage protection can be vital to the ongoing well-being of your family. Most people feel secure knowing that in the event of the income earner's death, the family will be relieved of a devastating financial burden.

SEC. 8

NEED ADDITIONAL INSURANCE?

Would you like more information or a quotation on additional amounts of life insurance for yourself, your spouse or your children? Just call our toll-free line or fill in the following:

| Name | Amount | Tobacco User | Birthdate | Sex | Type of Life Insurance |
|---|---|---|---|---|---|
| [John] | | ☐N ☐Y | _/_/_ | ☐F ☐M | ☐Permanent ☐Term |
| | | ☐N ☐Y | _/_/_ | ☐F ☐M | ☐Permanent ☐Term |

Call 1(800) 576-8273 o If you have any questions.   o Need more information.
o Need help with the enclosed forms.

APPENDIX 1D

|  | Number of Different Possibilities |
|---|---|
| Customer Information Logic | 15 |
| Word/Paragraph/Sentence Logic | 15 |
| Product/Plan/Amount of Coverage/Payment Mode/Underwriting Logic | 14 |
| Pricing Logic | 0 |
| Total | 44 |

| Total Front & Back Variables | 120 |
|---|---|

BACK OF LETTER

CERTIFICATE OF CORRECTION (continued)
U.S. Pat. No. 5,987,434

APPENDIX 2A

USA Savings & Loan
123 Oak Lane, Anytown, CA 99999

SEC. 1

John Smith
1234 Main St.
Anytown, CA 99999

Here are the insurance
quotes you requested!

04/12/96

Dear Mr. Smith:

Thank you for allowing USA Saving & Loan Insurance Services the opportunity to be of service to you.

The quotation for $50,000 of term and cash value life insurance you requested appears as Policy A below.

So that you may have an even wider choice of coverage from which to select, we are also illustrating prices for two different term insurance policies: one with premiums guaranteed for 10 years, and one with premiums guaranteed for 15 years.

For your review, we are also including optional amount choices that may, perhaps, meet your long range financial objectives even better.

Please, also take a moment to look over the additional benefits that are listed on the back of this letter. You may wish to include one, or all, to further enhance the coverage you select.

SEC. 2 For your convenience, we have enclosed all the necessary materials so you can apply for the coverage right now. Simply mark the selection box with your choices, then see the simple instructions on the back of this page. Or, if you prefer, call 1(800) 576-8273 extension 26 and let us do the rest.

Term Life Insurance

| Death Benefit ⇩ | 10 Year GUARANTEED TERM[*] | 15 Year GUARANTEED TERM[*] |
|---|---|---|
| $50,000 ⇨ | Monthly Cost $14.53 | Monthly Cost $16.41 |
| $75,000 ⇨ | Monthly Cost $18.51 | Monthly Cost $21.33 |
| $100,000 ⇨ | Monthly Cost $22.40 | Monthly Cost $26.16 |

Cash Value Life Insurance

| $50,000 Death Benefit[†] | $75,000 Death Benefit[†] |
|---|---|
| Monthly Cost $36.90 | Monthly Cost $52.72 |
| Total Cash Value Build-Up[††] | Total Cash Value Build-Up[††] |
| In 15 Years $4,958 | In 15 Years $7,438 |
| In 20 Years $7,924 | In 20 Years $11,887 |
| At Age 65 $11,389 | At Age 65 $17,085 |

Yes, I Select:

Amount: ☐ $50,000  ☐ $75,000  ☐ $100,000
Type: ☐ 10 Year Term  ☐ 15 Year Term  ☐ Cash Value
Billing Method[*]: ☐ Monthly (Automatic Checking Account Deduction)  ☐ Quarterly  ☐ Annual

[†] See other side for description of this choice and how to apply.  [*] Annual and quarterly modal prices will vary slightly from above premiums.
All prices are based on male, age 40, standard non-tobacco rates.
[††] Total cash value build-up is before any surrender charges and is based on monthly mortality deduction and interest credited to cash value accumulation account.

© by I.C.A. Insurance Marketing 1996 All rights reserved

APPENDIX 2B

SEC. 3

DESCRIPTION OF PLAN

Please do not mistake these policies for other insurance offers you may have previously been solicited to buy through the mail. Most of those offers are for group insurance. These policies are the same quality, individually owned policies with all the features and benefits all major life insurance companies sell through their agents.

○ The 10 Year Term Life Insurance Policy
This policy is a ten year guaranteed premium guaranteed renewable term life insurance policy. Premiums are guaranteed not to change for 10 years. Once you are approved for this coverage you are guaranteed the right to keep it through age 90. This policy can be converted to a level premium cash value life insurance policy[†].

○ The 15 Year Term Life Insurance Policy
This policy is a fifteen year guaranteed premium guaranteed renewable term life insurance policy. Premiums are guaranteed not to change for 15 years. Once you are approved for this coverage you are guaranteed the right to keep it through age 90. This policy can be converted to a level premium cash value life insurance policy[†].

○ The Cash Value Universal Life Insurance Policy
The Cash Value Life Insurance policy offered here is a flexible premium life insurance policy typically referred to as Universal Life. Structured to produce high cash values, the policy offers flexible and affordable protection[†].

SEC. 4

QUESTIONS AND ANSWERS

Q: How does Term Life Insurance differ from Cash Value Insurance?

A: There are several significant differences. Term Insurance is pure insurance, economical and simple. In the event of your death, your beneficiaries are guaranteed to receive the full benefit of your policy, income tax-free. The premium remains the same for a specific period of time (the term), then increases because of age when the policy renews for the next term.

Generally, Cash Value Insurance is designed to provide a level death benefit and may also be designed with premiums that are fixed or adjustable. In addition, a cash value life insurance policy generates a cash value build-up over the life of the policy which the insured can access if needed. Should the policy be surrendered, the insured will receive money back based on the cash surrender values in the policy at that time[††].

Q: When should I buy Term Insurance and when should I buy Cash Value Insurance?

A: Because Term Insurance is pure, simple protection, it is much cheaper than cash value insurance. You can generally buy more insurance for the amount of money you choose to spend. This is particularly important for a young family with limited income and a need for as much insurance as possible.

Cash Value Insurance is long-term insurance and if affordable should be the basic foundation of your life insurance protection program. Since many people keep their cash value life insurance policies for life, the net cost is often cheaper overall than buying term insurance.

The cash value build-up in a cash value insurance policy provides yet another safety measure for you. As time goes by, and when the policy cash values have grown sufficiently, you can access a portion of these funds should the need for emergency cash arise unexpectedly. And, as mentioned above, should you have to surrender your policy for any reason, you will receive money back if the existing cash values are sufficient[††]. All in all, cash value life insurance provides the *lifetime protection* you want, plus the flexibility to use the policy and its many features to keep pace with your changing lifestyle over the years.

SEC. 6

HOW TO OBTAIN THIS COVERAGE

1. CHOOSE: Select coverage desired and Billing Method by checking the box on the other side of this page.

2. FILL OUT: John Smith fills out the enclosed application answering all the questions. For Question 6A, please indicate either Plan A, B, or C, and for Question 6D, indicate any additional coverages desired.

3. SIGN: John Smith signs next to the two (2) red x's at the bottom of the application.

4. RETURN: Return this letter and application to us in the postage-paid envelope provided.

SEC. 5

Please note: If you choose a $100,000 Plan you will need to take a short paramedical examination, which we will arrange for you at your home or office, at no cost. You will be contacted by a paramed soon after we receive your application.

SEC. 8

ADDITIONAL BENEFITS

Term Insurance

Accidental Death Benefit: 10 yr. Term: $3.54 monthly / 15 yr. Term: $3.63 monthly
This rider provides a $50,000 death benefit in addition to the death benefit of your policy, in the event your death results from accidental bodily injury.

Child Rider: $4.90 monthly
You can provide your children with $10,000 of term insurance each if they are between the ages of 14 days and 18 years, and you are no more than 55 years old. Coverage expires at child's age 25, or your age 65, whichever comes first.

Waiver of Premium:
If you become totally and permanently disabled before age 60, any premiums falling due while you are disabled will be waived. Disability must last for at least three months, and you will have been paying those premiums falling due during this period. If, however, at the end of three months you are still totally and permanently disabled, all the premiums you paid during this period will be waived retroactively. The monthly cost for this additional benefit is: $.92 for Policy A (10 yr.), $.92 for Policy A (15 yr.), $1.24 for Policy B (10 yr.), $1.38 for Policy B (15 yr.), $1.04 for Policy C (10 yr.), and $1.04 for Policy C (15 yr.).

> Make your additional benefits selection here:
> □ Child Rider □ Waiver of Premium □ Accidental Death Benefit

Cash Value Insurance

Accelerated Death Benefit: NO CHARGE
If you are diagnosed by a physician as terminally ill, you may immediately receive 75% of the death benefit, up to $250,000, that would otherwise be payable at death. You will have the funds to provide for your care when you need it most.

Accelerated Death Benefit:
This rider provides a $50,000 death benefit in addition to the death benefit of your policy, in the event your death results from accidental bodily injury. The monthly cost of this additional benefit is: $3.71 for Policy A and $5.56 for Policy B.

Child Rider: $4.90 monthly
You can provide your children with $10,000 of term insurance each if they are between the ages of 14 days and 18 years, and you are no more than 55 years old. Coverage expires at child's age 25, or your age 65, whichever comes first.

Disability Waiver of Monthly Deductions:
If you become totally and permanently disabled before age 60, all policy fees, cost of insurance, and rider costs will be waived. This rider does not replace or waive the planned premium, just those portions of the premium mentioned above. The monthly cost of this additional benefit is: $.85 for Policy A and $1.26 for Policy B.

> Make your additional benefits selection here:
> □ Child Rider □ Waiver of Premium □ Accidental Death Benefit

SEC. 4

[†] Choices utilize XYZ of America Life Insurance Company, policy form Term10 (a 10 guaranteed year level premium and level death benefit renewable term insurance policy) and policy form Term15 (a 15 year guaranteed level premium and level death benefit renewable term insurance policy) and policy form HiCashUL (an interest-sensitive universal life cash value insurance policy with current interest rate of 6.75% and current mortality charges). If you desire more information regarding the policies and additional benefits offered here, or more information on the convertibility or re-entry features of these policies, please call our toll-free phone number 1(800) 636-7283.

[††] Total cash value build-up is before any surrender charges and is based on current monthly mortality deduction and interest credited to cash value accumulation account.

(12) EX PARTE REEXAMINATION CERTIFICATE (5934th)
United States Patent
Libman

(10) Number: US 5,987,434 C1
(45) Certificate Issued: Oct. 9, 2007

(54) APPARATUS AND METHOD FOR TRANSACTING MARKETING AND SALES OF FINANCIAL PRODUCTS

(75) Inventor: Richard Marc Libman, Santa Monica, CA (US)

(73) Assignee: Phoenix Licensing, LLC, Scottsdale, AZ (US)

Reexamination Request:
No. 90/007,498, Apr. 6, 2005

Reexamination Certificate for:
Patent No.: 5,987,434
Issued: Nov. 16, 1999
Appl. No.: 08/661,004
Filed: Jun. 10, 1996

Certificate of Correction issued Feb. 7, 2006.

(51) Int. Cl.
*G06Q 30/00* (2006.01)
*G06Q 40/00* (2006.01)

(52) U.S. Cl. .................. 705/36 R; 705/34; 705/35; 705/39; 705/42

(58) Field of Classification Search ............. 705/34–36, 705/39, 42
See application file for complete search history.

(56) References Cited

U.S. PATENT DOCUMENTS

| | | |
|---|---|---|
| 4,088,981 A | 5/1978 | Gott |
| 4,221,086 A | 9/1980 | Berman |
| 4,237,799 A | 12/1980 | Berman |
| 4,751,640 A | 6/1988 | Lucas et al. |
| 4,752,675 A | 6/1988 | Zetmeir |
| 5,124,911 A | 6/1992 | Sack |
| 5,220,501 A | 6/1993 | Lawlor et al. |
| 5,245,535 A | 9/1993 | Weiss et al. |
| 5,446,653 A | 8/1995 | Miller et al. |
| 5,453,601 A | 9/1995 | Rosen |
| 5,455,407 A | 10/1995 | Rosen |
| 5,557,518 A | 9/1996 | Rosen |
| 5,621,797 A | 4/1997 | Rosen |
| 5,642,419 A | 6/1997 | Rosen |
| 5,659,165 A | 8/1997 | Jennings et al. |

(Continued)

FOREIGN PATENT DOCUMENTS

| | | |
|---|---|---|
| CA | 2282873 | 3/2001 |
| EP | 0572281 A1 | 12/1993 |
| EP | 1071030 A1 | 1/2001 |
| WO | WO9715023 A2 | 4/1997 |
| WO | WO9734246 A1 | 9/1997 |
| WO | WO9922328 A1 | 5/1999 |

OTHER PUBLICATIONS

Webster's Collegiate Dictionary, Tenth Edition, p. 823.*
Osterland, Andrew, "Click Here for Coverage," Business Week, Jun. 1, 1998, 3 pages.

(Continued)

*Primary Examiner*—Michael O'Neill

(57) ABSTRACT

An apparatus and method which use client information to automatically select and present financial products appropriate for the client. The apparatus according to one aspect includes an input device for inputting client information, financial product information, ancillary data, and decision criteria; a storage device for storing the inputted items; decision making logic circuitry for using the inputted items to select a subset of the financial products; and an output device for preparing a client communication which identifies the subset of the financial products. The output device incorporates a portion of the client information and a portion of the financial products information into the client communication. The method according to one aspect includes inputting the same items; storing these inputted items; using the stored items to select a subset of the financial products; and preparing a client communication which identifies the subsets of the inputted information and incorporates it into the client communication.

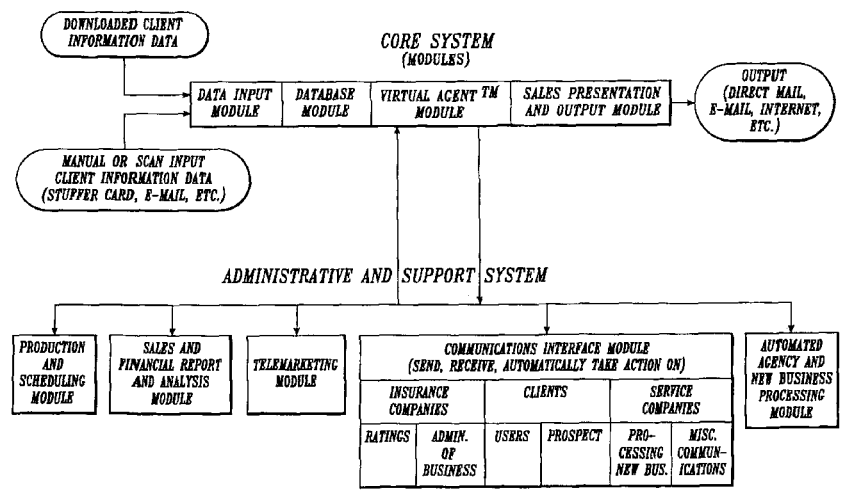

U.S. PATENT DOCUMENTS

| | | |
|---|---|---|
| 5,671,280 A | 9/1997 | Rosen |
| 5,671,282 A | 9/1997 | Wolff et al. |
| 5,673,402 A | 9/1997 | Ryan et al. |
| 5,703,949 A | 12/1997 | Rosen |
| 5,721,831 A | 2/1998 | Waits et al. |
| 5,732,400 A | 3/1998 | Mandler et al. |
| 5,745,886 A | 4/1998 | Rosen |
| 5,761,650 A | 6/1998 | Munsil et al. |
| 5,774,553 A | 6/1998 | Rosen |
| 5,787,403 A | 7/1998 | Randle |
| 5,794,218 A | 8/1998 | Jennings et al. |
| 5,799,087 A | 8/1998 | Rosen |
| 5,819,263 A | 10/1998 | Bromley et al. |
| 5,822,735 A | 10/1998 | De Lapa et al. |
| 5,825,856 A | 10/1998 | Porter et al. |
| 5,844,971 A | 12/1998 | Elias et al. |
| 5,852,811 A | 12/1998 | Atkins |
| 5,866,889 A | 2/1999 | Weiss et al. |
| 5,878,139 A | 3/1999 | Rosen |
| 5,890,140 A | 3/1999 | Clark et al. |
| 5,893,075 A | 4/1999 | Plainfield et al. |
| 5,898,154 A | 4/1999 | Rosen |
| 5,920,629 A | 7/1999 | Rosen |
| 5,930,764 A | 7/1999 | Melchione et al. |
| 5,953,423 A | 9/1999 | Rosen |
| 5,963,648 A | 10/1999 | Rosen |
| 5,963,968 A | 10/1999 | Warmus et al. |
| 5,966,695 A | 10/1999 | Melchione et al. |
| 5,978,485 A | 11/1999 | Rosen |
| 6,018,721 A | 1/2000 | Aziz et al. |
| 6,029,153 A | 2/2000 | Bauchner et al. |
| 6,047,067 A | 4/2000 | Rosen |
| 6,047,887 A | 4/2000 | Rosen |
| 6,049,782 A | 4/2000 | Gottesman et al. |
| 6,055,513 A | 4/2000 | Katz et al. |
| 6,058,378 A | 5/2000 | Clark et al. |
| 6,076,068 A | 6/2000 | De Lapa et al. |
| 6,076,072 A | 6/2000 | Libman |
| 6,088,686 A | 7/2000 | Walker et al. |
| 6,122,190 A | 9/2000 | Ooishi et al. |
| 6,122,625 A | 9/2000 | Rosen |
| 6,131,810 A | 10/2000 | Weiss et al. |
| 6,141,666 A | 10/2000 | Tobin |
| 6,154,527 A | 11/2000 | Porter et al. |
| 6,175,921 B1 | 1/2001 | Rosen |
| 6,188,993 B1 | 2/2001 | Eng et al. |
| 6,205,436 B1 | 3/2001 | Rosen |
| 6,226,623 B1 | 5/2001 | Schein et al. |
| 6,233,564 B1 | 5/2001 | Schulze |
| 6,236,975 B1 | 5/2001 | Boe et al. |
| 6,272,528 B1 | 8/2001 | Cullen et al. |
| 6,336,095 B1 | 1/2002 | Rosen |
| 6,349,290 B1 | 2/2002 | Horowitz et al. |
| 6,354,490 B1 | 3/2002 | Weiss et al. |
| 6,411,686 B1 | 6/2002 | Porter et al. |
| 6,453,302 B1 | 9/2002 | Johnson et al. |
| 6,513,019 B2 | 1/2003 | Lewis |
| 6,611,811 B1 | 8/2003 | Deaton et al. |
| 6,999,938 B1 | 2/2006 | Libman |
| 2003/0216965 A1 | 11/2003 | Libman |
| 2004/0030626 A1 | 2/2004 | Libman |
| 2004/0039588 A1 | 2/2004 | Libman |
| 2006/0004642 A1 | 1/2006 | Libman |

OTHER PUBLICATIONS

Stuart, Ann, "World Wide Winners," WebMaster Magazine, Aug. 1997, 11 pages.

Burch, Bill, "Companies turn to Internet server management firms," Network World, Sep. 26, 1994, 2 pages.

Ellsworth, Jill, "Staking a Claim on the Internet," Nation's Business, Jan. 1996, pp. 29–31.

Strazewski, Len, "Pioneers on the Web frontier," Rough Notes, May 1996, vol. 139, Issue 5, 4 pages.

Doucette, Nancy, "Aetna's newest location—on the Internet," Rough Notes, Nov. 1995, vol. 138, Issue 11, 3 pages.

"PC Quote partners in world's first virtual conference," Business Wire, Apr. 22, 1996, 2 pages.

"Quicken InsureMarket To Debut With Major Carriers as Partners," Business Wire, Jun. 11, 1996, 2 pages.

ABN–AMRO—Mortgage Acceleration Offer Letter Jul. 29, 2002, 3 pages.

American Airlines Advantage Program Statement, Dec. 8, 1998, 2 pages.

Enrico, Dottie, "Dollars and Dialers: Phone company's plan to sell names stirs controversy," Newsday v50 n279 s1, Nov. 1990, 4 pages.

Foley, John, "Market of One—Ready, Aim, Sell—Technology is helping companies treat their customers like individuals again. The payoff—and the challenges—can be enormous," Feb. 1997, 6 pages.

Globe Life and Accident Insurance Co. Solicitation, date unknown, 3 pages.

Jackson National Life Insurance Co. Solicitation, Jul. 21, 1995, 6 pages.

Teachers Insurance and Annuity Association Solicitation, about Nov. 1994, 4 pages.

"American Express Acquires License For Banc One's Triumph Card Processing Software," PR Newswire, PR Newswire Association, Inc., 2 pages (Feb. 6, 1995).

"Virtual Agent Custom Markets Bank Insurance: High–volume, low–touch selling boosts profits," FutureBanker, 1 Page (Nov. 1997).

ABN–AMRO Mortgage Acceleration Offer Letter, 2 pages, dated Jul. 29, 2002, earliest date for letters/processes of this type unknown but possibly early—1990's (unconfirmed).

Alliance Mortgage Company Equity Accelerator™ Solicitation Letter with attachments, 3 pages (dated Mar. 10, 1994).

America's Mortgage Servicing, Inc., unemployment insurance, Mar. 6, 1992, 4 pages.

AT&T Universal Gold MasterCard, Apr. 1993, 8 pages.

AT&T Universal MasterCard, Apr. 1993, 8 pages.

Berry, J. et al., "Database Marketing: A Potent New Tool for Selling," Business–Week, pp. 56–62 (Sep. 5, 1994).

Colonial Penn Life, 1Q91 GBL Birthday Results as of Dec. 27, 1991, 1 page.

Colonial Penn Life, 2Q91 GBL Birthday Results as of Dec. 27, 1991, 1 page.

Colonial Penn Life, 1Q91 Lifechoice Birthday Results as of Dec. 27, 1991, 1 page.

Colonial Penn Life, 1Q91 Doc. Ref. A09 Lifechoice Birthday Results as of Dec. 27, 1991, 1 page.

Colonial Penn Life, "Life Advertising 1986.", 1 page.

Colonial Penn Life, Memorandum, "4Q90 GBL Birthday Campaign—Input Document," May 8, 1990, 8 pages.

Colonial Penn Life "Happy Birthday" letter, internal date of Apr. 15, 1993, 2 pages.

Electronic Image Management—EIM, Brochure from Applied Systems, 6 pages (Jan. 1996).

Ford Citibank MasterCard billing statements, Feb. 1995, 2 pages.

Friedman, A.S., "Turnkey Selling Shifts Away From Quoting," National Underwriter, vol. 101, No. 46, National Underwriter Company, 1 Page (Nov. 17, 1997).

Goldstein, S., "Firstmerit Offers Customized Insurance Quotes With Checking Statements." Bank Investment Product News, vol. 111, No. 15, Institutional Investor, Inc., 1 Page (Apr. 21, 1997).

Institutional Telemarketing Services, Insurance Service Incorporated Brochure, 2 Pages (Date believed to be 1986 or 1987).

KeyMoney Access Account Statement, 2 pages (Jan. 27, 1997).

Larmer, F.L., "'Virtual Agent' Maximizes Small Bank Reach," National Underwriter, National Underwriter Company, p. 17 (Apr. 13, 1998).

Lauer, G., "FirstMerit: Using Technology to Personalize Mass–Marketed Life Insurance," Bank Insurance Marketing, vol. 6, No. 3, 2 Pages (Summer 1997).

NewcoTM News, Richard Libman, I.C.A. Insurance Marketing, Inc., 2 Pages (Jun. 1996).

Premiumatic Plan Life Insurance Solicitation, United Services Life Insurance Company, 4 pages, Aug. 1992.

SelectQuote Insurances Services Letter and Attachments, SelectQuote Insurance Services of San Francisco, California, 4 pages (Jul. 5, 1995).

SelectQuote Insurances Services Letter and Insurance Application, SelectQuote Insurance Services of San Francisco, California, 7 pages (Jun. 27, 1995).

SelectQuote Insurances Services Letter and Quote, SelectQuote Insurance Services of San Francisco, California, 8 pages (Jun. 12, 1995).

Sommers/Moreland & Associates, Inc. Letter and Quote, Sommers/Moreland & Associates, Inc., Atlanta, Georgia, 11 pages (Jul. 8, 1995).

Stanfed Financial Services, Inc., "Biweekly Advantage Plan," home mortgage payment acceleration, Jul. 30, 1993, 6 pages.

The Agency Manager: Putting Everything On The Desktop with Applied Systems, Software Brochure, Applied Systems, Los Angeles, California, 12 pages (1994).

USLife All American Life Insurance Company Account Statement, 1 page (appears to be before Jan. 15, 1997.

Wells Fargo Proven Credit Visa Gold Account Statement, 4 pages (Jan. 8, 1997).

* cited by examiner

US 5,987,434 C1

1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7, 19, 30–34 and 46 is confirmed.

Claims 8, 14, 15, 16, 20, 21, 22, 23, 25, 28, 35, 41, 42, 43, 47–50, 52 and 55 are determined to be patentable as amended.

Claims 9–13, 17, 18, 24, 26, 27, 29, 36–40, 44, 45, 51, 53, 54 and 56, dependent on an amended claim, are determined to be patentable.

New claims 57–160 are added and determined to be patentable.

8. An apparatus for using client information about clients to automatically select and present financial products appropriate for each of the clients, the apparatus comprising:
means for inputting the client information, information about the financial products, and decision criteria pertaining to selection from among the financial products, the client information comprising information other than a client name, address, age, marital status, tobacco habits, and amount of life insurance coverage for a given client; *wherein said means for inputting the client information is adapted to automatically input the client information without human intervention between input of respective client records;*
means operatively coupled to the inputting means for storing the client information, the financial products information, and the decision criteria;
means operatively coupled to the storing means for using (a) the client information including the information other than a client name, address, age, marital status, tobacco habits, and amount of life insurance coverage for a given client, (b) the financial products information, and (c) the decision criteria to select a subset of the financial products for each of the clients appropriate for that client; and
means for preparing a client communication for each of the clients which identifies the subset of the financial products for that client.

14. An apparatus for using client information about clients to automatically select and present [financial] *life insurance* products appropriate for each of the clients, the apparatus comprising:
means for inputting the client information, information about the [financial] *life insurance* products including [financial] *life insurance* products having [the] differing face value amounts, and decision criteria pertaining to selection from among the [financial] *life insurance* products;

2 means operatively coupled to the inputting means for storing the client information, the [financial] *life insurance* products information, and the decision criteria;
means operatively coupled to the storing means for using the client information, the [financial] *life insurance* products information, and the decision criteria to select a subset of the [financial] *life insurance* products for each of the clients appropriate for that client, the selecting means including means for selecting the subset of [financial] *life insurance* products to include the [financial] *life insurance* products having the differing face value amounts; and
means for preparing a client communication for each of the clients which identifies the subset of the [financial] *life insurance* products for that client.

15. An apparatus for using client information about clients to automatically select and present financial products appropriate for each of the clients, the apparatus comprising:
means for inputting the client information, information about the financial products, and decision criteria pertaining to selection from among the financial products, the financial product information including a plurality of plans wherein at least one of the plans includes a plurality of the financial products; *wherein said means for inputting the client information is adapted to automatically input the client information without human intervention between input of respective client records to a relational database;*
*further wherein said means for inputting includes means for automatically gathering the client information required for the respective client records from one or more non-resident databases and also includes means for formatting said client information to be compatible with the relational database;*
means operatively coupled to the inputting means for storing the client information, the financial products information, and the decision criteria;
means operatively coupled to the storing means for using the client information, the financial products information, and the decision criteria to select a subset of the financial products in the form of a plurality of the plans for each of the clients appropriate for that client; and
means for preparing a client communication for each of the clients which identifies the subset of the financial products for that client.

16. An apparatus for using client information about clients to automatically select and present financial products appropriate for each of the clients, the apparatus comprising:
means for inputting the client information, information about the financial products, ancillary data, and decision criteria pertaining to selection from among the financial products; *wherein said means for inputting is adapted to automatically input the client information without human intervention between input of respective client records; and*
*further wherein said means for inputting also includes means for automatically recognizing speech data from a client, such that said client information also includes client speech related data;*
means operatively coupled to the inputting means for storing the client information, the financial products information, the ancillary data and the decision criteria;
means operatively coupled to the storing means for using the client information, the financial products information, the ancillary data and the decision criteria to select a subset of the financial products for each of the clients appropriate for that client; and means for preparing a client communication for each of the clients which identifies the subset of the financial products for that client.

20. An apparatus for using client information about clients to automatically select and present [financial] *life insurance* products appropriate for each of the clients, the apparatus comprising:

means for inputting (a) the client information, (b) information about the [financial] *life insurance* products wherein the [financial] *life insurance* products have differing face values, and (c) decision criteria pertaining to selection from among the [financial] *life insurance* products;

means operatively coupled to the inputting means for storing the client information, the [financial] *life insurance* products information, and the decision criteria;

means operatively coupled to the storing means for using the client information, the [financial] *life insurance* products information, and the decision criteria to select a subset of the [financial] *life insurance* products for each of the clients appropriate for that client, wherein the subset of [financial] *life insurance* products includes the [financial] *life insurance* products having differing face values; and means for preparing a client communication for each of the clients which identifies the subset of the [financial] *life insurance* products for that client.

21. An apparatus for using client information about clients to automatically select and present financial products appropriate for each of the clients, the apparatus comprising:

means for inputting (a) the client information, (b) information about the financial products including product price data and non-price product information, and (c) decision criteria pertaining to selection from among the financial products; *wherein said means for inputting is adapted to automatically input the client information without human intervention between input of respective client records; and*

*further wherein said means for inputting includes means for automatically determining and gathering the client information required for the respective client records based on analyzing the information about the financial products;* means operatively coupled to the input means for storing the client information, the financial products information, and the decision criteria;

means operatively coupled to the storing means for using the client information, the financial products information including the non-price product information, and the decision criteria to select a subset of the financial products for each of the clients appropriate for that client; and means for preparing a client communication for each of the clients which identifies the subset of the financial products for that client.

22. An apparatus for using client information about clients to automatically select and present financial products appropriate for each of the clients, the apparatus comprising:

means for inputting the client information, information about the financial products, a plurality of plans each of which includes at least one of the financial products, and decision criteria pertaining to selection from among the plans; *wherein said means for inputting the client information is adapted to automatically input the client information without human intervention between input of respective client records;* means operatively coupled to the inputting means for storing the client information, the financial products information, the plans, and the decision criteria;

means operatively coupled to the storing means for using the client information, the financial products information, the plans and the decision criteria to select a subset of the plans for each of the clients appropriate for that client, the subset of the plans including at least one plan comprising a plurality of the financial products; and means for preparing a client communication for each of the clients which identifies the subset of the plans for that client.

23. An apparatus for using client information about clients to automatically select and present financial products appropriate for each of the clients, the apparatus comprising:

means for inputting the client information, information about the financial products, and decision criteria pertaining to selection from among the financial products; *wherein said means for inputting the client information is adapted to automatically retrieve at least some of the client information from a database over an online network and to input the client information without human intervention between input of respective client records;* means operatively coupled to the inputting means for storing the client information, the financial products information, and the decision criteria;

means operatively coupled to the storing means for using the client information, the financial products information, and the decision criteria to select a subset of the financial products for each of the clients appropriate for that client; and means for preparing a client communication for each of the clients which identifies the subset of the financial products for that client, the client communication preparing means incorporating a portion of the client information other than a client name, address, age, marital status, tobacco habits, and amount of life insurance coverage for a given client.

25. An apparatus for using client information about clients to automatically select and present financial products appropriate for each of the clients, the apparatus comprising:

means for inputting the client information, information about the financial products, and decision criteria pertaining to selection from among the financial products;

*wherein said means for inputting is configured to automatically retrieve any and all client information items required as content of a client record in a client database coupled to said means for inputting, and to input the client information into the client database without human intervention between input of respective client records;* means operatively coupled to the inputting means for storing the client information, the financial products information, and the decision criteria;

means operatively coupled to the storing means for using the client information, the financial products information, and the decision criteria to select a subset of the financial products for each of the clients appropriate for that client; and means for preparing a client communication for each of the clients which identifies the subset of the financial products for that client, the client communication means further using words/paragraphs/sentence logic to incorporate at least one of variable words, variable paragraphs, and variable sentences into each of the client communications.

28. An apparatus for using client information to automatically select and present financial products appropriate for each of the clients, the apparatus comprising:
means for inputting the client information, information about the financial products, and decision criteria pertaining to selection from among the financial products; *wherein said means for inputting is configured to automatically retrieve any and all client information items required as content of a client record in a client database coupled to said means for inputting, and to input the client information into the client database without human intervention between input of respective client records;*
means operatively coupled to the inputting means for storing the client information, the financial products information, and the decision criteria;
means operatively coupled to the storing means for using the client information, the financial products information, and the decision criteria to select a subset of the financial products for each of the clients; and
means for preparing a client communication for each of the clients which identifies the subset of the financial products for that client, the client communication preparing means incorporating into each of the client communications a portion of the client information for that client and a portion of the financial products information for the subset of products selected for that client, the client communication preparing means further using at least one of (a) customer information logic, (b) words/paragraphs/sentence logic, (c) product/plan/amount of coverage/payment mode/underwriting logic, and (d) pricing logic to incorporate at least one of the client information and the financial product information into a footnote within each of the client communications.

35. A method for using client information about clients to automatically select and present financial products appropriate for each of the clients, the method comprising the steps of:
inputting into a computer-accessible storage medium the client information, information about the financial products, and decision criteria pertaining to selection from among the financial products, the client information comprising information other than a client name, address, age, marital status, tobacco habits, and amount of life insurance coverage for a given client; *wherein said inputting of the client information is done automatically and without human intervention between input of respective client records;*
using a central processing unit in communication with the storage medium to select for each of the clients a subset of the financial products appropriate for that client using (a) the client information including the information other than a client name, address, age, marital status, tobacco habits, and amount of life insurance coverage for a given client, (b) the financial products information, and (c) the decision criteria; and
using an output device to prepare a client communication for each of the clients which identifies the subset of the financial products for that client.

41. A method for using client information about clients to automatically select and present [financial] *life insurance* products appropriate for each of the clients, the method comprising:
inputting into a computer-accessible storage medium the client information, information about the [financial] *life insurance* products including [financial] *life insurance* products having differing face value amounts, and decision criteria pertaining to selection from among the [financial] *life insurance* products;
using a central processing unit in communication with the storage medium to select a subset of the [financial] *life insurance* products using the client information, the [financial] *life insurance* products information, and the decision criteria to select a subset of the [financial] *life insurance* products for each of the clients appropriate for that client, the selecting step including selecting the subset of [financial] *life insurance* products to include the [financial] *life insurance* products having the differing face value amounts; and
using an output device to prepare a client communication for each of the clients which identifies the subset of the [financial] *life insurance* products for that client.

42. A method for using client information about clients to automatically select and present financial products appropriate for each of the clients, the method comprising:
inputting into a computer-accessible storage medium the client information, information about the financial products, and decision criteria pertaining to selection from among the financial products, the financial product information including a plurality of plans wherein at least one of the plans includes a plurality of the financial products; *wherein said inputting of the client information is done automatically and without human intervention between input of respective client records to a relational database;*
*further wherein said for inputting includes automatically gathering the client information required for the respective client records from one or more non-resident databases and formatting said client information to be compatible with the relational database;*
using a central processing unit in communication with the storage medium to select a subset of the financial products in the form of a plurality of the plans for each of the clients appropriate for that client using the client information, the financial products information, and the decision criteria; and
using an output device to prepare a client communication for each of the clients which identifies the subset of the financial products for that client.

43. A method for using client information about clients to automatically select and present financial products appropriate for each of the clients, the method comprising:
*automatically recognizing speech data from a client, such that said client information also includes client speech related data;*
inputting into a computer-accessible storage medium the client information, information about the financial products, ancillary data, and decision criteria pertaining to selection from among the financial products; *wherein the client information is automatically input to a database located on the computer-accessible storage medium without human intervention between input of respective client records;*
using a central processing unit in communication with the storage medium to select for each of the clients a subset of the financial products appropriate for that client using the client information, the financial products information, the ancillary data and the decision criteria; and using an output device to prepare a client communication for each of the clients which identifies the subset of the financial products for that client.

47. A method for using client information about clients to automatically select and present [financial] *life insurance* products appropriate for each of the clients, the method comprising:

inputting into a machine-readable storage medium (a) the client information, (b) information about the [financial] *life insurance* products wherein the [financial] *life insurance* products have differing face values, and (c) decision criteria pertaining to selection from among the [financial] *life insurance* products;

using a central processing unit in communication with the storage medium to select a subset of the [financial] *life insurance* products for each of the clients appropriate for that client using the client information, the [financial] *life insurance* products information, and the decision criteria, wherein the subset of [financial] *life insurance* products includes the [financial] *life insurance* products having differing face values; and using an output device to prepare a client communication for each of the clients which identifies the subset of the [financial] *life insurance* products for that client.

48. A method for using client information about clients to automatically select and present financial products appropriate for each of the clients, the method comprising:

inputting into a machine-readable storage medium (a) the client information, (b) information about the financial products including product price data and non-price product information, and (c) decision criteria pertaining to selection from among the financial products; *wherein inputting automatically inputs the client information without human intervention between input of respective client records; and*

*further wherein said inputting includes automatically determining and gathering the client information required for the respective client records based on analyzing the information about the financial products;* using a central processing unit in communication with the storage medium to select a subset of the financial products for each of the clients appropriate for that client using the client information, the financial products information including the non-price product information, and the decision criteria; and using an output device to prepare a client communication for each of the clients which identifies the subset of the financial products for that client.

49. A method for using client information about clients to automatically select and present financial products appropriate for each of the clients, the method comprising:

inputting into a machine-readable storage medium the client information, information about the financial products, a plurality of plans each of which includes at least one of the financial products, and decision criteria pertaining to selection from among the plans;

*wherein said inputting of the client information is done automatically and without human intervention between input of respective client records;* using a central processing unit in communication with the storage medium to select a subset of the plans for each of the clients appropriate for that client using the client information, the financial products information, the plans and the decision criteria, the subset of the plans including at least one plan comprising a plurality of the financial products; and using an output device to prepare a client communication for each of the clients which identifies the subset of the plans for that client.

50. A method for using client information about clients to automatically select and present financial products *and plans* appropriate for each of the clients, the method comprising:

inputting into a machine-readable storage medium the client information, information about the financial products, *the plans* and decision criteria pertaining to selection from among the financial products; *wherein the client information is automatically retrieved from a database over an online network and input to the machine-readable storage medium without human intervention between respective client records;* using a central processing unit in communication with the storage medium to select a subset of the plans for each of the clients appropriate for that client using the client information, the financial products information, and the decision criteria; and using an output device to prepare a client communication for each of the clients which identifies the subset of the [financial products] *plans* for that client, the client communication incorporating a portion of the client information other than a client name, address, age, marital status, tobacco habits, and amount of life insurance coverage for a given client.

52. A method for using client information about clients to automatically select and present financial products appropriate for each of the clients, the method comprising:

*controlling a machine executable program to automatically retrieve any and all client information items required as content of a client record in a client database for the client information;* inputting into a machine-readable storage medium the client information, information about the financial products, and decision criteria pertaining to selection from among the financial products; *wherein said inputting of the client information into the client database on the machine-readable storage medium occurs without human intervention between input of respective client records;* using a central processing unit in communication with the storage medium to select a subset of the [plans] *financial products* for each of the clients appropriate for that client using the client information, the financial products information, and the decision criteria; and using an output device to prepare a client communication for each of the clients which identifies the subset of the financial products for that client, the client communication preparing step further including using words/ paragrahs/ sentence logic to incorporate at least one of variable words, variable paragraphs, and variable sentences into each of the client communications.

55. A method for using client information about clients to automatically select and present financial products appropriate for each of the clients, the method comprising:

*controlling a machine executable program to automatically retrieve any and all client information items required as content of a client record in a client database for the client information;* inputting into a machine-readable storage medium the client information, information about the financial products including plans pertaining to the financial products, and decision criteria pertaining to selection from among the financial products; *wherein said inputting of the client information into the client database on the machine-readable storage medium occurs without human intervention between input of respective client records;* using a central processing unit in communication with the storage medium to select a subset of the plans for each of the clients appropriate for that client using the client information, the financial products information, and the decision criteria; and using an output device to prepare a client communication for each of the clients which identifies the subset of the financial products for that client, wherein each of the client communications includes a portion of the client information for that client and a portion of the financial products information for the subset of products selected for that client, the client communication preparing step including using at least one of (a) customer information logic, (b) words/paragraphs/sentence logic, (c) product/plan/amount of coverage/payment mode/underwriting logic, and (d) pricing logic to incorporate at least one of the client information and the financial product information into a footnote within each of the client communications.

57. The method of claim 2, wherein the plurality of client records are retrieved automatically from a resident electronic database which is coupled to said central processing unit and/or from a non-resident electronic database accessible over an online network connection.

58. The method of claim 2 wherein said financial products comprise one or more financial products or financial plans relating thereto.

59. The method of claim 2 wherein said client information includes one or more of client name, address, age, account number and/or demographic information.

60: The method of claim 2 wherein said plurality of client records are automatically organized as one or more groups of clients in a client database, and further including steps: selecting one or more different financial products for each of said one or more groups of clients, such that different groups can be offered one or more different financial products.

61. The method of claim 2, wherein said financial product information includes one or more of product benefits, issue constraints, price and/or compliance information.

62. The method of claim 2, wherein at least said client information is updated automatically without human intervention.

63. The method of claim 2, wherein said client information also includes potential client information.

64. The method of claim 2 wherein each of the financial products is considered for inclusion in said subset of the financial products for each client.

65. The method of claim 2, further including a step: performing calculations based on data pertinent to a financial product and a client to at least one of design and price a financial product.

66. The method of claim 2, further including a step: calculating one or more amounts and/or costs of one or more particular financial products to offer to each client.

67. The method of claim 2, wherein said subset of financial products are selected for each of the clients by predicting with the central processing unit which financial products a particular client is likely to buy based on an analysis of sales programs involving said financial products or particular client.

68. The method of claim 2 further including steps: providing second financial product information concerning one or more second financial products to be offered to a group of clients associated with the plurality of client records; and causing the central processing unit to select a second subset of said second financial products appropriate for each of such group of clients.

69. The method of claim 2 wherein said client communication has a format that comprises at least one portion that accommodates variable information, wherein said variable information at least partially identifies, specifies and/or promotes said financial product or a plan relating thereto being offered to said client, and such that said variable information may vary among clients being offered a particular financial product or plan relating thereto.

70. The method of claim 2 wherein said financial products are embodied as one more financial plans presented within said client communication, each of said financial plans including one or more financial products with a corresponding benefit customized for each of the clients.

71. The method of claim 2, wherein said client communication is in printed form and/or in electronic form.

72. The method of claim 2 wherein said client communication includes one or more variable content footnotes which are associated with a particular financial product, such that first footnotes in a first client communication to a first client differ from second footnotes in a second client communication to a second client for such particular financial product.

73. The method of claim 2 wherein a layout and format of said client communication can be automatically varied between clients for a particular financial product or plan relating thereto.

74. The method of claim 2, wherein said client communications are prepared in groups corresponding to groupings by different client types and/or groupings by different financial product types or different plan types.

75. The method of claim 74, wherein one or more financial products or plans related thereto prepared for a particular client group is/are designed and customized for each client in such client group based on said client information for such client.

76. The method of claim 2, further including a step: executing a production and scheduling routine to control timing and prioritization of operations performed by the central processing unit to select said subset of financial products.

77. The method of claim 2, further including a step: executing a production and scheduling routine to control timing and prioritization of operations performed by the central processing unit to prepare and output said client communications.

78. The method of claim 2 wherein a single automated process is used to select said subset of financial products and prepare said client communication.

79. The method of claim 47, wherein the differing face values are determined by using one or more of demographics information, client information, and/or cost associated with obtaining said life insurance products.

80. The method of claim 47, wherein the differing face values are presented in the client communication which further includes multiple prices offered for one or more life insurance products offered to each client.

81. The method of claim 47, wherein the differing face values presented in the client communication to a particular client are designed and customized based on financial information associated with said particular client.

82. The method of claim 47, wherein the differing face values presented in the client communication to clients is designed and customized based on financial information associated with said particular client such that different face value amounts can be presented for a particular life insurance product to different clients.

83. The method of claim 47, wherein the inputting of client information is done automatically without human intervention between input of respective client records.

84. The method of claim 47, wherein the client information is retrieved automatically from a resident electronic database which is coupled to said central processing unit and/or from a non-resident electronic database accessible over an online network connection.

85. The method of claim 47 wherein said life insurance products comprise one or more life insurance products or financial plans relating thereto.

86. The method of claim 47 wherein said client information includes one or more of client name, address, age, account number and/or demographic information.

87. The method of claim 47 wherein said client information is automatically organized as one or more groups of clients in a client database, and further including steps: selecting one or more different life insurance products for each of said one or more groups of clients, such that different groups can be offered one or more different life insurance products.

88. The method of claim 47, wherein said life insurance product information includes one or more of product benefits, issue constraints, price and/or compliance information.

89. The method of claim 47, wherein at least said client information is updated automatically without human intervention.

90. The method of claim 47, wherein said client information also includes potential client information.

91. The method of claim 47 wherein each of the life insurance products is considered for inclusion in said subset of the life insurance products for each client.

92. The method of claim 47, further including a step: performing calculations based on data pertinent to a life insurance product and a client to at least one of design and price a life insurance product.

93. The method of claim 47, further including a step: calculating one or more amounts and/or costs of one or more particular life insurance products to offer to each client.

94. The method of claim 47, wherein said subset of life insurance products are selected for each of the clients by predicting with the central processing unit which life insurance products a particular client is likely to buy based on an analysis of sales programs involving said life insurance products or particular client.

95. The method of claim 47 further including steps: providing second life insurance product information concerning one or more second life insurance products to be offered to a group of clients associated with the plurality of client records; and causing the central processing unit to select a second subset of said second life insurance products appropriate for each of such group of clients.

96. The method of claim 47 wherein said client communication has a format that comprises at least one portion that accommodates variable information, wherein said variable information at least partially identifies, specifies and/or promotes said life insurance product or a plan relating thereto being offered to said client, and such that said variable information may vary among clients being offered a particular life insurance product or plan relating thereto.

97. The method of claim 47 wherein said life insurance products are embodied as one more life insurance plans presented within said client communication, each of said life insurance plans including one or more life insurance products with a corresponding benefit customized for each of the clients.

98. The method of claim 47, wherein said client communication is in printed form and/or in electronic form.

99. The method of claim 47 wherein said client communication includes one or more variable content footnotes which are associated with a particular life insurance product, such that first footnotes in a first client communication to a first client differ from second footnotes in a second client communication to a second client for such particular life insurance product.

100. The method of claim 47 wherein a layout and format of said client communication can be automatically varied between clients for a particular life insurance product or plan relating thereto.

101. The method of claim 47, wherein said client communications are prepared in groups corresponding to groupings by different client types and/or groupings by different life insurance product types or different plan types.

102. The method of claim 101, wherein one or more life insurance products or plans relating thereto prepared for a particular client group is/are designed and customized for each client in such client group based on said client information for such client.

103. The method of claim 47, further including a step: executing a production and scheduling routine to control timing and prioritization of operations performed by the central processing unit to select said subset of life insurance products.

104. The method of claim 47, further including a step: executing a production and scheduling routine to control timing and prioritization of operations performed by the central processing unit to prepare and output said client communications.

105. The method of claim 47 wherein a single automated process is used to select said subset of life insurance products and prepare said client communication.

106. The method of claim 48, wherein the price data is determined by using one or more of financial products information, demographics information, client information, and/or cost associated with obtaining said financial products.

107. The method of claim 48, wherein the price data is included in said client communication and inclues multiple prices offered for one or more financial products offered to each client.

108. The method of claim 48, wherein the price data presented in the client communication to a particular client is designed and customized based on financial information associated with said particular client.

109. The method of claim 48, wherein the price data presented in the client communication to clients is designed and customized based on financial information associated with said particular cient, such that a price for a particular financial product can vary between clients.

110. The method of claim 48, wherein the client information is retrieved automatically from a resident of electronic database which is coupled to said central processing unit and/or from a non-resident electronic database accessible over an online network connection.

111. The method of claim 48 wherein said financial products comprise one or more financial products or financial plans relating thereto.

112. The method of claim 48 wherein said client information includes one or more of client name, address, age, account number and/or demographic information.

113. The method of claim 48 wherein said client information is automatically organized as one or more groups of clients in a client database, and further including steps: selecting one or more different financial products for each of said one or more groups of clients, such that different groups can be offered one or more different financial products.

114. The method of claim 48, wherein said financial product information includes one or more of product benefits, issue constraints, price and/or compliance information.

115. The method of claim 48, wherein at least said client information is updated automatically without human intervention.

116. The method of claim 48, wherein said client information also includes potential client information.

117. The method of claim 48 wherein each of the financial products is considered for inclusion in said subset of the financial products for each client.

118. The method of claim 48, further including a step: performing calculations based on data pertinent to a financial product and a client to at least one of design and price a financial product.

119. The method of claim 48, further including a step: calculating one or more amounts and/or costs of one or more particular financial products to offer to each client.

120. The method of claim 48, wherein said subset of financial products are selected for each of the clients by predicting with the central processing unit which financial products a particular client is likely to buy based on an analysis of sales programs involving said financial products or particular client.

121. The method of claim 48 further including steps: providing second financial product information concerning one or more second financial products to be offered to a group of clients associated with the plurality of client records; and causing the central processing unit to select a second subset of said second financial products appropriate for each of such group of clients.

122. The method of claim 48 wherein said client communication has a format that comprises at least one portion that accommodates variable information, wherein said variable information at least partially identifies, specifies and/or promotes said financial product or a plan relating thereto being offered to said client, and such that said variable information may vary among clients being offered a particular financial product and/or plan relating thereto.

123. The method of claim 48 wherein said financial products are embodied as one more financial plans presented within said client communication, each of said financial plans including one or more financial products with a corresponding benefit customized for each of the clients.

124. The method of claim 48, wherein said client communication is in printed form and/or in electronic form.

125. The method of claim 48 wherein said client communication includes one or more variable content footnotes which are associated with a particular financial product, such that first footnotes in a first client communication to a first client differ from second footnotes in a second client communication to a second client for such particular financial product.

126. The method of claim 48 wherein a layout and format of said client communication can be automatically varied between clients for a particular financial product or plan relating thereto.

127. The method of claim 48, wherein said client communications are prepared in groups corresponding to groupings by different client types and/or groupings by different financial product types or different plan types.

128. The method of claim 127, wherein one or more financial products or plans related thereto prepared for a particular client group is/are designed and customized for each client in such client group based on said client information for such client.

129. The method of claim 48, further including a step: executing a production and scheduling routine to control timing and prioritization of operations performed by the central processing unit to select said subset of financial products.

130. The method of claim 48, further including a step: executing a production and scheduling routine to control timing and prioritization of operations performed by the central processing unit to prepare and output said client communications.

131. The method of claim 48 wherein a single automated process is used to select said subset of financial products and prepare said client communication.

132. The method of claim 55, wherein said word/paragraphs/sentence logic generates variable words, variable paragraphs, and variable sentences that are customized so that a particular financial product can be presented differently to different clients in said client communications.

133. The method of claim 55, wherein said words/paragraphs/sentence logic generates variable words, variable paragraphs, and variable sentences are customized so that content situated in a first portion of a first client communication can be presented in a second portion of a second client communication, so that said content is presented differently to different clients in said client communications.

134. The method of claim 55 wherein said financial product information, underwriting data and/or issue limit data is presented differently in footnotes to different clients in said client communications.

135. The method of claim 55 wherein the pricing logic presents price data in the client communication to a particular client that is designed and customized based on financial information associated with said particular client.

136. The method of claim 55 wherein a compliance footnote may vary from client to client based on financial product information, client information, and underwriting/issue guidelines.

137. The method of claim 55 wherein pricing, cost and/or explanations of how pricing or cost for the offer was derived are presented differently in footnotes to different clients in said client communications.

138. The method of claim 55, wherein said plans include financial products having differing face value amounts and/or different client qualification requirements.

139. The method of claim 55, wherein said plans are designed and presented in the client communication based on one or more of a marital status, gender, age, or income for each client, so that different plans are presented to different clients for a financial product.

140. The method of claim 55, wherein the client information is retrieved automatically from a resident electronic database which is coupled to said central processing unit and/or from a non-resident electronic database accessible over an online network connection.

141. The method of claim 55 wherein said financial products comprise one or more financial products or financial plans relating thereto.

142. The method of claim 55 wherein said client information includes one or more of client name, address, age, account number and/or demographic information.

143. The method of claim 55 wherein said client information is automatically organized as one or more groups of clients in a client database, and further including steps: selecting one or more different financial products for each of said one or more groups of clients, such that different groups can be offered one or more different financial products.

144. The method of claim 55, wherein said financial product information includes one or more of product benefits, issue constraints, price and/or compliance information.

145. The method of claim 55, wherein at least said client information is updated automatically without human intervention.

146. The method of claim 55, wherein said client information also includes potential client information.

147. The method of claim 55 wherein each of the financial products is considered for inclusion in said subset of the financial products for each client.

148. The method of claim 55, further including a step: performing calculations based on data pertinent to a financial product and a client to at least one of design and price a financial product.

149. The method of claim 55, further including a step: calculating one or more amounts and/or costs of one or more particular financial products to offer to each client.

150. The method of claim 55, wherein said subset of financial products are selected for each of the clients by predicting with the central processing unit which financial products a particular client is likely to buy based on an analysis of sales programs involving said financial products or particular client.

151. The method of claim 55 further including steps: providing second financial product information concerning one or more second financial products to be offered to a group of clients associated with the plurality of client records; and causing the central processing unit to select a second subset of said second financial products appropriate for each of such group of clients.

152. The method of claim 55 wherein said financial products are embodied as one more financial plans presented within said client communication, each of said financial plans including one or more financial products with a corresponding benefit customized for each of the clients.

153. The method of claim 55, wherein said client communication is in printed form and/or electronic form.

154. The method of claim 55 wherein said client communication includes one or more variable content footnotes which are associated with a particular financial product, such that first footnotes in a first client communication to a first client differ from second footnotes in a second client communication to a second client for such particular financial product.

155. The method of claim 55 wherein a layout and format of said client communication can be automatically varied between clients for a particular financial product or plan relating thereto.

156. The method of claim 55, wherein said client communications are prepared in groups corresponding to groupings by different client types and/or groupings by different financial product types or different plan types.

157. The method of claim 156, wherein one or more financial products or plans related thereto prepared for a particular client group is/are designed and customized for each client in such client group based on said client information for such client.

158. The method of claim 55, further including a step: executing a production and scheduling routine to control timing and prioritization of operations performed by the central processing unit to select said subset of financial products.

159. The method of claim 55, further including a step: executing a production and scheduling routine to control timing and prioritization of operations performed by the central processing unit to prepare and output said client communications.

160. The method of claim 55 wherein a single automated process is used to select said subset of financial products and prepare said client communication.

* * * * *

(12) EX PARTE REEXAMINATION CERTIFICATE (6783rd)
United States Patent
Libman

(10) Number: US 5,987,434 C2
(45) Certificate Issued: Apr. 21, 2009

(54) APPARATUS AND METHOD FOR TRANSACTING MARKETING AND SALES OF FINANCIAL PRODUCTS

(75) Inventor: Richard Marc Libman, Santa Monica, CA (US)

(73) Assignee: Phoenix Licensing, LLC, Scottsdale, AZ (US)

Reexamination Request:
No. 90/008,900, Oct. 26, 2007

Reexamination Certificate for:
Patent No.: 5,987,434
Issued: Nov. 16, 1999
Appl. No.: 08/661,004
Filed: Jun. 10, 1996

Reexamination Certificate C1 5,987,434 issued Oct. 9, 2007

Certificate of Correction issued Feb. 7, 2006.

(51) Int. Cl.
*G06Q 30/00* (2006.01)
*G06Q 40/00* (2006.01)

(52) U.S. Cl. .................. 705/36 R; 705/34; 705/35; 705/39; 705/42

(58) Field of Classification Search .............. None
See application file for complete search history.

(56) References Cited

U.S. PATENT DOCUMENTS

| | | |
|---|---|---|
| 4,088,981 A | 5/1978 | Gott |
| 4,221,086 A | 9/1980 | Berman |
| 4,237,799 A | 12/1980 | Berman |
| 4,567,359 A | 1/1986 | Lockwood ............ 235/381 |
| 4,751,640 A | 6/1988 | Lucas et al. |
| 4,752,675 A | 6/1988 | Zetmeir |
| 4,831,526 A | 5/1989 | Luchs et al. |
| 5,039,075 A | 8/1991 | Mayer ................. 270/1.1 |
| 5,124,911 A | 6/1992 | Sack |
| 5,220,501 A | 6/1993 | Lawlor et al. |
| 5,245,535 A | 9/1993 | Weiss et al. |
| 5,319,542 A | 6/1994 | King, Jr. et al. |
| 5,388,165 A | 2/1995 | Deaton et al. ............ 382/7 |
| 5,425,127 A * | 6/1995 | Yato et al. ............ 704/234 |
| 5,446,653 A | 8/1995 | Miller et al. |
| 5,446,891 A | 8/1995 | Kaplan et al. |
| 5,453,601 A | 9/1995 | Rosen |

(Continued)

FOREIGN PATENT DOCUMENTS

| | | |
|---|---|---|
| CA | 2 282 873 | 3/2001 |
| CA | 2 590 237 | 3/2001 |
| EP | 0 354 260 A1 | 2/1990 |
| EP | 0 572 281 A1 | 12/1993 |
| EP | 1 071 030 A1 | 1/2001 |
| WO | WO 97/15023 | 4/1997 |
| WO | WO 97/34246 | 9/1997 |
| WO | WO 99/12115 | 3/1999 |
| WO | WO 99/22328 | 5/1999 |

OTHER PUBLICATIONS

U.S. Appl. No. 09/592,086, filed Jun. 2000, Libman.

(Continued)

Primary Examiner—Jeffrey R. Jastrzab

(57) ABSTRACT

An apparatus and method which use client information to automatically select and present financial products appropriate for the client. The apparatus according to one aspect includes an input device for inputting client information, financial product information, ancillary data, and decision criteria; a storage device for storing the inputted items; decision making logic circuitry for using the inputted items to select a subset of the financial products; and an output device for preparing a client communication which identifies the subset of the financial products. The output device incorporates a portion of the client information and a portion of the financial products information into the client communication. The method according to one aspect includes inputting the same items; storing these inputted items; using the stored items to select a subset of the financial products; and preparing a client communication which identifies the subsets of the inputted information and incorporates it into the client communication.

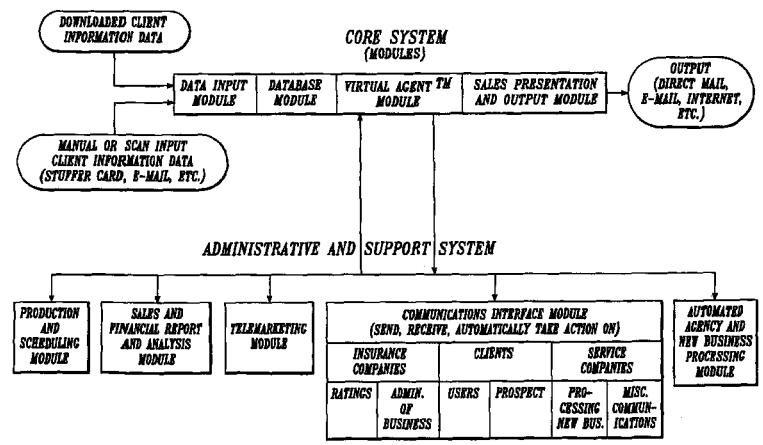

U.S. PATENT DOCUMENTS

| | | | |
|---|---|---|---|
| 5,455,407 A | 10/1995 | Rosen | |
| 5,502,636 A | 3/1996 | Clarke | |
| 5,504,675 A | 4/1996 | Cragun et al. | |
| 5,523,942 A | 6/1996 | Tyler et al. | |
| 5,537,314 A | 7/1996 | Kanter | |
| 5,557,518 A | 9/1996 | Rosen | |
| 5,576,951 A | 11/1996 | Lockwood | 395/227 |
| 5,592,375 A | 1/1997 | Salmon et al. | |
| 5,619,558 A | 4/1997 | Jheeta | 379/90 |
| 5,621,797 A | 4/1997 | Rosen | |
| 5,640,835 A | 6/1997 | Muscoplat | |
| 5,642,419 A | 6/1997 | Rosen | |
| 5,644,727 A | 7/1997 | Atkins | |
| 5,651,280 A | 7/1997 | Park | |
| 5,655,085 A | 8/1997 | Ryan et al. | |
| 5,659,165 A | 8/1997 | Jennings et al. | |
| 5,671,280 A | 9/1997 | Rosen | |
| 5,671,282 A | 9/1997 | Wolff et al. | |
| 5,673,402 A | 9/1997 | Ryan et al. | |
| 5,699,527 A | 12/1997 | Davidson | |
| 5,703,949 A | 12/1997 | Rosen | |
| 5,710,889 A | 1/1998 | Clark et al. | |
| 5,721,831 A | 2/1998 | Waits et al. | |
| 5,732,400 A | 3/1998 | Mandler et al. | |
| 5,745,886 A | 4/1998 | Rosen | |
| 5,761,650 A | 6/1998 | Munsil et al. | |
| 5,774,553 A | 6/1998 | Rosen | |
| 5,787,403 A | 7/1998 | Randle | |
| 5,794,218 A | 8/1998 | Jennings et al. | |
| 5,799,087 A | 8/1998 | Rosen | |
| 5,806,057 A | 9/1998 | Gormley et al. | 707/1 |
| 5,819,241 A | 10/1998 | Reiter | |
| 5,819,263 A | 10/1998 | Bromley et al. | |
| 5,822,735 A | 10/1998 | De Lapa et al. | |
| 5,825,856 A | 10/1998 | Porter et al. | |
| 5,844,971 A | 12/1998 | Elias et al. | |
| 5,852,811 A | 12/1998 | Atkins | |
| 5,866,889 A | 2/1999 | Weiss et al. | |
| 5,878,139 A | 3/1999 | Rosen | |
| 5,890,140 A | 3/1999 | Clark et al. | |
| 5,893,075 A | 4/1999 | Plainfield et al. | |
| 5,898,154 A | 4/1999 | Rosen | |
| 5,920,629 A | 7/1999 | Rosen | |
| 5,930,764 A | 7/1999 | Melchione et al. | |
| 5,953,423 A | 9/1999 | Rosen | |
| 5,963,648 A | 10/1999 | Rosen | |
| 5,963,968 A | 10/1999 | Warmus et al. | |
| 5,966,695 A | 10/1999 | Melchione et al. | |
| 5,974,396 A | 10/1999 | Anderson et al. | 705/10 |
| 5,978,485 A | 11/1999 | Rosen | |
| 5,987,434 A | 11/1999 | Libman | |
| 6,018,721 A | 1/2000 | Aziz et al. | |
| 6,026,370 A | 2/2000 | Jermyn | 705/14 |
| 6,029,153 A | 2/2000 | Bauchner et al. | |
| 6,047,067 A | 4/2000 | Rosen | |
| 6,047,887 A | 4/2000 | Rosen | |
| 6,049,782 A | 4/2000 | Gottesman et al. | |
| 6,055,513 A | 4/2000 | Katz et al. | |
| 6,058,378 A | 5/2000 | Clark et al. | |
| 6,076,068 A | 6/2000 | De Lapa et al. | |
| 6,076,072 A | 6/2000 | Libman | |
| 6,088,686 A | 7/2000 | Walker et al. | |
| 6,122,190 A | 9/2000 | Ooishi | |
| 6,122,625 A | 9/2000 | Rosen | |
| 6,131,810 A | 10/2000 | Weiss et al. | |
| 6,141,666 A | 10/2000 | Tobin | |
| 6,154,527 A | 11/2000 | Porter et al. | |
| 6,175,921 B1 | 1/2001 | Rosen | |
| 6,188,993 B1 | 2/2001 | Eng et al. | |
| 6,205,436 B1 | 3/2001 | Rosen | |
| 6,226,623 B1 | 5/2001 | Schein et al. | |
| 6,233,564 B1 | 5/2001 | Schulze et al. | |
| 6,236,975 B1 | 5/2001 | Boe et al. | |
| 6,272,528 B1 | 8/2001 | Cullen et al. | |
| 6,327,599 B1 | 12/2001 | Warmus et al. | 707/517 |
| 6,336,095 B1 | 1/2002 | Rosen | |
| 6,349,290 B1 | 2/2002 | Horowitz et al. | |
| 6,354,490 B1 | 3/2002 | Weiss et al. | |
| 6,411,686 B1 | 6/2002 | Porter et al. | |
| 6,453,302 B1 | 9/2002 | Johnson et al. | |
| 6,470,156 B1 | 10/2002 | Sahay | |
| 6,513,019 B2 | 1/2003 | Lewis | |
| 6,611,811 B1 | 8/2003 | Deaton et al. | |
| 6,999,938 B1 | 2/2006 | Libman | |
| 7,072,849 B1 | 7/2006 | Filepp et al. | |
| 2003/0216965 A1 | 11/2003 | Libman | |
| 2004/0030626 A1 | 2/2004 | Libman | |
| 2004/0039588 A1 | 2/2004 | Libman | |
| 2006/0004642 A1 | 1/2006 | Libman | |

OTHER PUBLICATIONS

ABN–AMRO Mortgage Acceleration Offer Letter, 2 pages, dated Jul. 29, 2002, earliest date for letters/process of this type unknown but possibly early 1990's (unconfirmed).

"Agenda for Windows" "Marketing and Sales Campaigns" Software Brochure from Agenda Corporation, Nov. 1995.

"Agency Manager for Windows" Software Brochure from Applied Systems, Inc., Los Angeles, CA, 1994.

Alliance Mortgage Company Equity Accelerator™ Solicitation Letter with attachments, 3 pages (dated Mar. 10, 1994).

American Airlines Advantage Program Statement, Dec. 8, 1998.

American Express Acquires License for Bank One's Triumph Card Processing Software, PR Newswire Association, Inc., 2 pages (Feb. 6, 1995).

American Savings Bank Solicitation, about Feb. 1995.

America's Mortagage Servicing, Inc., Unemployment insurance, Mar. 6, 1992, 4 pages. Servicing, Inc.—Letter.

AT&T Account Statement, Jan. 1997.

AT&T Universal Gold MasterCard, Apr. 1993, 8 pages.

AT&T Universal MasterCard, Apr. 1993, 8 pages.

Colonial Penn Life, 1Q91 GBL Birthday Results as of Dec. 27, 1991, 1 page.

Colonial Penn Life, 1Q91 Lifechoice Birthday Results as of Dec. 27, 1991, 1 page.

Colonial Penn Life, 1Q91 Doc. Ref. A09 Lifechoice Birthday Results as of Dec. 27, 1991, 1 page.

Colonial Penn Life, 2Q91 GBL Birthday Results as of Dec. 27, 1991, 1 page. Colonial Penn Life, 2Q91 Lifechoice Birthday Results as of Dec. 27, 1991, 1 page.

Colonial Penn Life "Happy Birthday" letter, internal date of Apr. 15, 1993, 2 pages.

Colonial Penn Life, "Life Advertising 1986." 1 page.

Colonial Penn Life, Memorandum, "4Q90 GBL Birthday Campaign—Input Document," May 8, 1990, 8 pages.

Consumer's Choice Financial Services Company Quote, Nov. 28, 1995.

CUNA Life Insurance Solicitation, date unknown. American Savings Bank Solicitation, about Feb. 1995. (Sic "CONA").

Berry, J. et al., "Database Marketing: A Potent New Tool for Selling," Business Week, pp. 56–62 (Sep. 5, 1994).

David T. Phillips & Co. Insurance Solicitation, Nov. 17, 1995.

Enrico, D. "Dollars and Dialers: Phone Company's plan to sell names stirs controversy", Newsday v50 n279 s1, p3. Jun. 11, 1990.

Electronic Image Management—EIM, Brochure from Applied Systems, 6 pages (Jan. 1996).
Equigaurd Insurance Services, Inc. Solicitation, Nov. 1995.
"FirstMerit Offers Cutomized Insurance Quotes With Checking Statements." Bank Investment Product News, vol. 111, No. 15, Institutional Investor, Inc., 1 Page (Apr. 21, 1997).
"FirstMerit: Using Technology to Personalize Mass Market Life Insurance," Bank Insurance Marketing, vol. 6, No. 3, 2 pages (summer 1997).
Ford Citibank MasterCard billing statements, Feb. 1995, 2 pages.
Globe Life Accident Insurance Co. Solicitation, Jul. 21, 1995.
Institutional Telemarketing Services, Insurance Service Incorporated Brochure, 2 pages (Date believed to be 1986 or 1987).
IQ InsuranceQuote Services, Inc. Solicitation, Jul. 12, 1995.
Jackson National Life Insurance Co. Solicitation, Jul. 21, 1995.
KeyMoney Access Account Statement, 2 pages (Jan. 27, 1997).
NewcoTM News, Richard Libman, I.C.A. Insurance Marketing, Inc., 2 Pages (Jun. 1996).
Premiumatic Plan Life Insurance Solicitation, United Services Life Insurance Company, 4 pages, Aug. 1992.
Foley, John, "Market of one: Ready Aim Sell," Information Week, pp. 34–36, 40, 42, and 44 (Feb. 17, 1997).
SelectQuote Insurances Services Letter and Attachments, SelectQuote Insurance Services of San Francisco, California, 4 pages (Jul. 5, 1995).
SelectQuote Insurances Services Letter and Insurance Application, SelectQuote Insurance Services of San Francisco, California, 7 pages (Jun. 27, 1995).
SelectQuote Insurances Services Letter and Quote, SelectQuote Insurance Services of San Francisco, California, 8 pages (Jun. 12, 1995).
Sommers/Moreland & Associates, Inc., Letter and Quote, Sommers/Moreland & Associates, Inc., Atlanta, Georgia, 11 pages (Jul. 8, 1995).
Stanfed Financial Services, Inc., "Biweekly Advantage Plan," home mortgage payment acceleration, Jul. 30, 1993, 6 pages.
Teacher's Insurance and Annuity Association Solicitation, about Nov. 1994.
"Turnkey Selling Shifts Away from Quoting," National Underwriter, vol. 101, No. 46, National Underwriter Company, 1 Page (Nov. 17, 1997).
USAA Credit Card Statement Attachment, 1997.
"Virtual Agent Custom Markets Bank Insurance"—Article, Future Banker, Nov. 1997(original) reprinted in National Underwriter Apr. 13, 1998.
"Virtual Agent Maximizes Small Bank Reach," National Underwriter, National Underwriter Company, p. 17 (Apr. 13, 1998).
Wells Fargo Insurance Services Letter and Sales Literature, Wells Fargo Insurance Services, Brisbane, CA, date unknown.
Wells Fargo Proven Credit Visa Gold Account Statement, 4 pages (Jan. 8, 1997).
"Click Here for Coverage," Business Week (describing online shopping for insurance), Jun. 1, 1998.
"Driving Forces," World Wide Web Winners, WebMaster Magazine (describing Progressive Web Site), Aug. 1997.
Burch, Bill, "Companies turn to Internet server management firms," Network World (describing internet server outsourcing), Sep. 26, 1994.
Ellsworth, Jill H., "Staking a claim on the Internet," Nation's Business (small paragraph on p. 30 describing SDG Insurance Agency use of on–line forms), Jan. 1996.
Strazewski, Len, "Pioneers on the Web frontier," Rough Notes (describing agency insurance companies going online), May 1996.
Doucette, Nancy, "Aetna's newest location—on the Internet," Rough Notes (describing Aetna Life's electronic storefront), Nov. 1995.
"PC Quote partners in world's first virtual conference," Business Wire (describing stock quoting service), Apr. 22, 1996.
"Quicken InsureMarket To Debut With Major Carriers as Partners," Business Wire (describing Inuit partnering with insurance companies), Jun. 11, 1996.
"Computer helps marketers romance business clients," Marketing News, American Marketing Association, Chicago, IL, US, vol. 22, No. 6, Mar. 14, 1988, pp. 8–9.
"Using the computer to convert advertising enquiries into sales" Best's Review. Property—Casualty Insurance Edition, A.M. Best, US, vol. 83, No. 10, Feb. 1983, pp. 62,64.
"Market Fax: Computerized Support for Sales and Marketing," Small Business Computers, vol. 7, No. 3, May 1983, pp. 51–53.
"A Survey of Database Marketing," Graduate School of Management and Department of Information and Computer Science, University of California, Mar. 1999, pp. 1–45.
"A Lasting Relationship (Database in Direct Marketing)" Marketing, Haymarket Publishing, London, GB, vol. 25, No. 8, May 22, 1986, pp. 49–50, 52.
"Variable–Data Printing Comes of Age: Capabilities & Market Demand Coverage," Seybold Report on Publishing Systems, Media, PA, US, vol. 27, No. 2, Sep. 15, 1997, pp. 3–24.
"Hand–in–Hand Profit for Marketing and Data Processing," Direct Marketing, Hoke Communications, Garden City, NY, US, vol. 48, No. 6, Oct. 1985, pp. 60, 62, 65, 92, 137, 166–167.
Excerpts from "The New Age of Financial Services Marketing, A Hands–on Applications Guide to Harnessing the Power of Database Marketing," Financial Sourcebooks, Naperville, Illinois, 1992, 59 pages.
Excerpts from "Database Marketing, The Ultimate Marketing Tool," McGraw–Hill, Inc., 1993, 65, pages.
Customize Your Cross–sell, 1993.
Webster's Collegiate Dictionary, Tenth Edition, p. 823, 1983.
*The New Age of Financial Services Marketing: A Hands–on Applications Guide to Harnessing the Power of Database Marketing,* edited by Arthur Holtman et al. (1992).
*Database Marketing: The Ultimate Marketing Tool* by Edward Nash, (1993).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1–160 is confirmed.

* * * * *